(12) United States Patent
Akiyama et al.

(10) Patent No.: US 7,242,445 B2
(45) Date of Patent: *Jul. 10, 2007

(54) DISPLAY DEVICE HAVING FLEXIBILITY WITH A CONTACT MEMBER ALLOWING THE FIRST AND SECOND PLATES TO BE SLID IN THE SECOND DIRECTION

(75) Inventors: Masahiko Akiyama, Tokyo (JP); Masao Tanaka, Kanagawa-ken (JP); Yujiro Hara, Kanagawa-ken (JP); Rieko Fukushima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 11/345,384

(22) Filed: Feb. 2, 2006

(65) Prior Publication Data

US 2006/0125973 A1 Jun. 15, 2006

Related U.S. Application Data

(63) Continuation of application No. 10/787,462, filed on Feb. 27, 2004, now Pat. No. 7,027,110.

(30) Foreign Application Priority Data

Mar. 18, 2003 (JP) .............................. 2003-072999

(51) Int. Cl.
*G02F 1/1333* (2006.01)

(52) U.S. Cl. ............................ 349/58; 349/60; 349/65; 349/67; 349/70; 349/158

(58) Field of Classification Search .................. 349/1, 349/58, 70, 60, 65, 67, 155, 156
See application file for complete search history.

(56) References Cited

U.S. PATENT DOCUMENTS

| 4,950,072 | A | 8/1990 | Honda |
| 6,201,586 | B1 | 3/2001 | Nakayama |
| 6,295,102 | B1 | 9/2001 | Higa et al. |
| 2001/0035921 | A1 | 11/2001 | Yamanami |

FOREIGN PATENT DOCUMENTS

| JP | 10-257143 | 9/1988 |
| JP | 11-272205 | 10/1999 |

*Primary Examiner*—Andrew Schechter
*Assistant Examiner*—Lucy Chien
(74) *Attorney, Agent, or Firm*—Oblon, Spivak, McClelland, Maier & Neustadt, P.C.

(57) ABSTRACT

A display device disclosed herein comprises: a display part including a first thin plate having flexibility and a second thin plate having flexibility, the second thin plate being provided on the first thin plate; a fixing portion which fixes the first thin plate and the second thin plate together on a first direction within each main surface of the first and second thin plates; and a close contact member which is provided in a second direction perpendicular to the first direction within the main surface, and which brings the first thin plate and the second thin plate into close contact.

21 Claims, 17 Drawing Sheets

DISPLAY DEVICE HAVING FLEXIBILITY WITH A CONTACT MEMBER ALLOWING THE FIRST AND SECOND PLATES TO BE SLID IN THE SECOND DIRECTION

CROSS-REFERENCE TO RELATED APPLICATIONS

This application is a continuation of and claims the benefit of priority from U.S. application Ser. No. 10/787,462, filed Feb. 27, 2004, now U.S. Pat. No. 7,027,110 and is based upon and claims the benefit of priority from the prior Japanese Patent Application No. 2003-072999, filed on Mar. 18, 2003, the entire contents of which are incorporated herein by reference.

BACKGROUND OF THE INVENTION

1. Field of the Invention

The present invention relates to a display device, and more particularly to a display device having flexibility.

2. Related Background Art

Active matrix type display devices in which active elements such as TFTs are arranged at pixels can realize flat type display devices with high image quality. As display parts of the active matrix type display devices, liquid crystal being a light shutter, organic EL which emits light, and electrophoretic devices (enclosed in microcapsules or not), can be used. These active matrix type display devices, having a thin profile and lightweight, are therefore most suitable for display devices of portable information equipment such as a notebook personal computer or PDA which can be carried.

It is conceivable that portable information equipment will be used more widely in the future with radio network improvements, and therefore display devices of the portable information equipment are required to be further reduced in thickness and weight. In response to this requirement, an active matrix type display device using a plastic substrate is proposed. Its examples include a transfer method of taking active elements, which have been formed on a heat-resistant substrate such as a glass substrate in advance, out of the glass substrate and transferring them onto a plastic substrate, a method of forming active elements directly on a plastic substrate by an ultra-low temperature process, and a method of forming organic transistors on a plastic substrate. By these methods, it is possible not only to reduce display devices in thickness and weight but also to make them flexible so that the devices can be bent.

As flexible display devices, there are known examples in which the display devices can be accommodated rolled or folded. For example, see Japanese Patent Laid-open No. Hei 11-272205 (P.2–8, FIG. 1), and Japanese Patent Laid-open No. Hei 10-257143 (P.3–5, FIG. 1).

However, the above-described display devices have a problem that they have complicated structures, and therefore a bendable display device with a simple configuration has been desired.

BRIEF SUMMARY OF THE INVENTION

In view of the above-mentioned problem, an object of the present invention is to provide a flexible display device with a simple configuration.

In order to accomplish the aforementioned and other objects, according to one aspect of the present invention, a display device, comprises:

a display part including a first thin plate having flexibility and a second thin plate having flexibility, the second thin plate being provided on the first thin plate;

a fixing portion which fixes the first thin plate and the second thin plate together on a first direction within each main surface of the first and second thin plates; and a close contact member which is provided in a second direction perpendicular to the first direction within the main surface, and which brings the first thin plate and the second thin plate into close contact.

According to another aspect of the present invention, a display device, comprises:

a display part including a first thin plate having flexibility and a second thin plate having flexibility, the second thin plate being provided on the first thin plate;

a fixing portion which fixes the first thin plate and the second thin plate together on a first direction within each main surface of the plates;

a first close contact member which has flexibility and which is provided linearly in a second direction perpendicular to the first direction within a surface of the first thin plate which faces the second thin plate; and a second close contact member which has flexibility and which is provided linearly in the second direction within a surface of the second thin plate which faces the first thin plate, the first thin plate and the second thin plate being slidably engaged with each other.

DETAILED DESCRIPTION OF THE INVENTION

Figure 1:
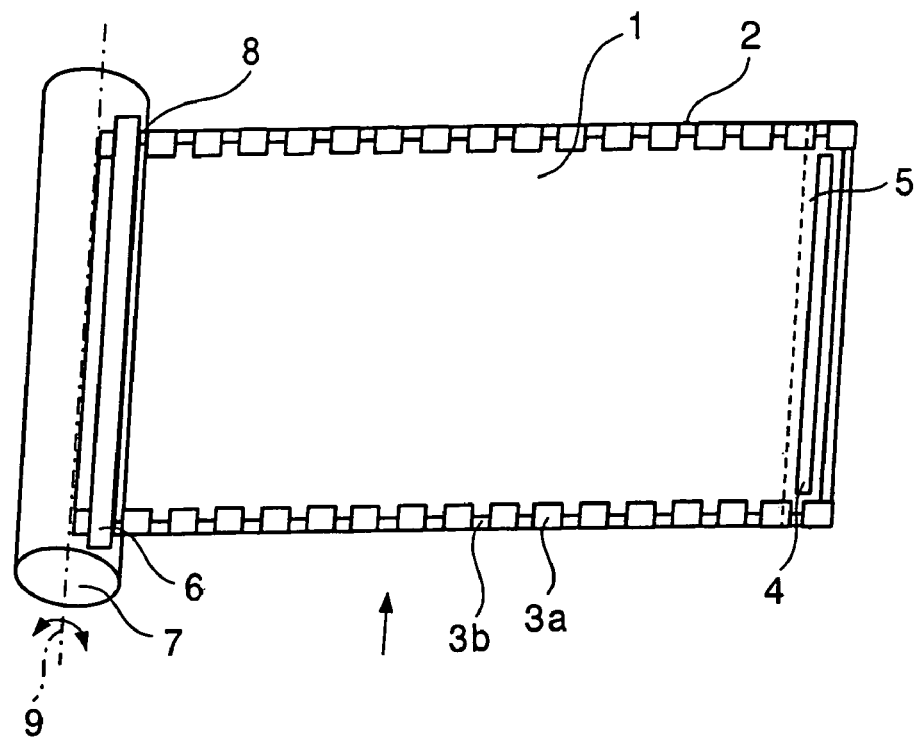
FIG. 1 is an oblique perspective view of an active matrix type display device according to a first embodiment of the present invention.

To realize a structure which accommodates a thin display device by rolling or folding it, the display device often includes, as members constituting a display part thereof, two or more plate-shaped members such as a liquid crystal cell and a backlight. For example, when one tries to bend a display device having two plate-shaped members, there occurs displacement therebetween caused by a difference in length between an outer periphery and an inner periphery thereof because of a thickness of the plate-shaped member of about 0.1 mm to about 1 mm even if it is made thin. Thus, if the two plate-shaped members are fixed to each other, there arises a problem that a crease is formed in the inner plate-shaped member when they are bent. The crease can be avoided if one of the plate-shaped members is made of an elastic material, but the material is limited, failing to actually realize the structure. Further, when a highly elastic material is in use, a force to contract slightly acts on the display part which is kept extended to eliminate production of a crease, and as a result the display part might become curved to decrease in flatness during display.

Hence, the present inventors studied various configurations of a bendable display device and, as a result, found a structure in which two or more plate-shaped members are constituted of thin plates bendable at least in one direction within a main surface (a display surface), and they are fixed to each other or one another on one straight line perpendicular to the bendable direction within the display surface and are brought into close contact with each other or one another in the bendable direction to be allowed to displace in the direction and be slidable, thus reaching the present invention. These plate-shaped members need to be bent at least in a direction within the display surface, and are more preferably made using a flexible material and therefore bendable in all directions. Besides, that the two members are brought into close contact means its integrated state in which displacement is allowed in one direction and not in the other directions.

Specifically, for example, when a first thin plate and a second thin plate are used as the plate-shaped members, a close contact member in a direction parallel to the bendable direction within the display surface may be a guide member which allows displacement only in the bendable direction. Further, the close contact member may include a first close contact member provided linearly in the bendable direction on a surface of the first thin plate on the side facing the second thin plate and a second close contact member provided linearly in the bendable direction on a surface of the second thin plate on the side facing the first thin plate, and the first thin plate and the second thin plate may be slidably engaged with each other.

Besides, the first thin plate and second thin plate can be, but are not limited to, a liquid crystal cell on which pixels are formed in an array form, organic EL cell, electrophoretic cell, electrochemical effect cell, mechanically display cell, polarizing plate, input device, backlight, cover, or the like, which can be used in combination as necessary. As a matter of course, three or more plate-shaped members such as a cover, liquid crystal cell, backlight, and so on can also be used as the display part, and this case only needs such a structure that the three or more plate-shaped members are constituted of thin plates bendable at least in one direction, which are fixed on one straight line perpendicular to the bendable direction and retained in the bendable direction.

When the three or more plate-shaped members are fixed, the one line within the display surface where the first thin plate and second thin plate are fixed and the one line within the display surface where the second thin plate and third thin plate are fixed may be different as long as they are substantially parallel to each other. Further, these plate-shaped members may be almost rectangular and may be other shapes also in which case the close contact member brings the plate-shaped members into close contact in the direction perpendicular to the straight line where the fixing portion fixes the plate-shaped members.

The present invention can provide a display device in which even if the plate-shaped members constituting the display part are somewhat thick and there is a difference in length between an inner periphery and an outer periphery when the display part is wound or folded, the difference can be absorbed by displacing the members since the close contact member is provided which allows the plate-shaped members to be slidable from each other. When display is performed with the display device extended, the plate-shaped members are fixed to each other by the fixing portion and therefore their relative positions are fixed at all times so that the display can be stably performed. Further, the display device of the present invention can be preferably used as display device portions of portable information equipment such as a notebook personal computer, PDA, and so on.

Preferred embodiments of the present invention will be described below in detail with reference to the drawings, but the present invention is not limited to these embodiments.

First Embodiment

First, a first embodiment of the present invention is described. FIG. 1 is an oblique perspective view showing an active matrix type display device of this embodiment, and FIG. 2 is a perspective view as seen from a direction of an arrow in FIG. 1.

Figure 2:
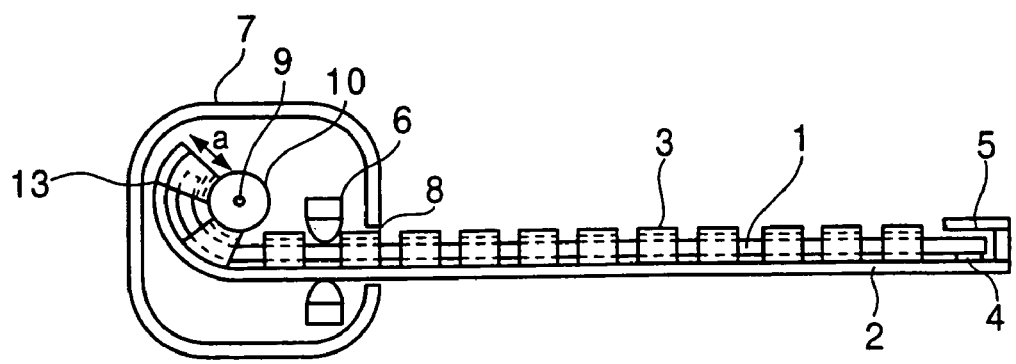
FIG. 2 is a perspective view as seen from a direction of an arrow in FIG. 1.

As shown in FIG. 1 and FIG. 2, the active matrix type display device of this embodiment has a display part in which a liquid crystal cell (a first thin plate) 1 which will be a display main part and a backlight (a second thin plate) 2 which will be a display secondary part are stacked one upon the other. In this embodiment, the surface on the liquid crystal cell 1 side becomes a display surface.

The liquid crystal cell 1 and backlight 2 are integrated by a plurality of retainers (guide members) 3a which are provided on two parallel sides of the backlight 2 and which partially cover surface end portions of the surface of the liquid crystal cell 1 on the side not facing the backlight 2. Specifically, the retainers 3a are provided on the backlight 2 and exist from two facing sides of the liquid crystal cell 1 to portions of the surface of the liquid crystal cell 1 not facing the backlight 2, and the retainers 3a may be in contact with the liquid crystal cell 1 but is not bonded thereto. The existence of the retainers 3a prevents the liquid crystal cell 1 from moving in a direction perpendicular to the sides where the retainer 3a exist. The retainers 3a integrate the liquid crystal cell 1 and backlight 2 with a thickness a given at a degree at which they can be displaced in a direction parallel to the sides where the retainers 3a are provided. The liquid crystal cell 1 and backlight 2 are made of a flexible material which can be bent at least in the direction (a bendable direction) of the sides where the retainers 3 exist.

The liquid crystal cell 1 and backlight 2 are fixed to each other by a fixing portion 4 existing on a side (a straight line) perpendicular to the sides where the retainers 3a are provided. At another side parallel to the side where the fixing portion 4 is provided, retainers (retainer supporting portions) 13 are fixed to a roll 10 in an accommodating container 7 so that the display part is configured to be capable of projecting and retracting through an outlet port 8 and being wound around the roll 10 with a winding axis 9 as a center. The retainer supporting portions 13 integrate the liquid crystal cell 1 and backlight 2 while keeping the thickness a shown in FIG. 2, and therefore when the display part is wound around the winding axis 9, the liquid crystal cell 1 is displaced to move ahead the retainer supporting portions 13, that is, to the winding axis 9 side.

Further, a protective portion 5 is provided in a region of the surface of the liquid crystal cell 1 opposite and corresponding to the fixing portion 4, that is, an end portion.

In the vicinity of the outlet port 8 in the accommodating container 7, clamps 6 are provided, and the clamps 6 hold and fix the liquid crystal cell 1 and backlight 2 therebetween. The clamps 6 increase the space therebetween when the display part is drawn out or wound in so as not to come into contact with the display part, and press the display part from above and below to stop it when stopping the motion of the display part such as when the display part is completely drawn out or wounded in or stopped midway.

Next, a manufacturing method of the active matrix type display device of this embodiment is described.

The liquid crystal display cell 1 holds nematic liquid crystal between two transparent plastic substrates. One of the plastic substrates is used as an array substrate, a TFT array is formed on the array substrate, a color filter is formed on the array, and pixel electrodes made of ITO are formed on the surface of the filter. Further, on the array substrate, spacers are formed of an acrylic resin or the like, and they are fixed on the array substrate.

This TFT array in use is made by forming polysilicon TFTs or amorphous silicon TFTs on a glass substrate by a predetermined manufacturing method, then removing the glass substrate, and transferring TFTs on the surface thereof to a plastic substrate (array substrate). The TFTs and the array substrate are bonded together with a UV curing adhesive, thermosetting adhesive, thermoplastic adhesive, or the like. As the plastic substrate as the array substrate, PES, a transparent acrylic resin, UV curing resin, thermosetting resin, or the like can be used. The array substrate is made 0.02 mm to 0.15 mm in thickness. The thinner, the more effective the substrate increases in flexibility. The structure is made such that the a color filter layer and pixel electrodes are layered, in addition to the TFT array, on the glass substrate, and the pixel electrodes and TFTs are connected by contact holes provided in the color filter layer, and only transparent electrodes are formed on the other plastic substrate, that is, an opposite substrate, thereby rarely causing a problem of positional displacement.

The opposite substrate should be one in which transparent electrodes made of ITO are formed on a plastic substrate. The plastic substrate used as the opposite substrate is desirably made of the same material as that of the array substrate. The thickness is the same as that of the array substrate, 0.02 mm to 0.15 mm.

Alignment films are formed on respective facing surfaces of the array substrate and the opposite substrate and rubbed perpendicularly to each other, and then their peripheries are sealed with sealant to form a cell. After liquid crystal is injected therein, its injection port is sealed, thus obtaining the liquid crystal cell 1.

Incidentally, not shown in FIG. 1 and FIG. 2, polarizing plates are provided above and below the liquid crystal cell.

The polarizing plates are fixed to the liquid crystal cell 1 at the fixing portion 4 while other portions are kept out of contact therewith.

The backlight 2 in use is one in which organic EL is formed as a light emitting layer on a flexible substrate made of plastic or the like. First, a transparent conductive layer (an electrode), electron injection layer, light emitting layer, hole injection layer, alkaline buffer layer, and transparent layer (an electrode), are formed on the flexible substrate (for example, a plastic substrate) on which a thin metal film or barrier layer is formed. Thereon a multi barrier layer is formed in which polymer layers and inorganic film layers such as SiOx or SiNx are alternately deposited. As for possible methods, the polymer layers can be made by vacuum depositing monomers and irradiating them with UV into polymers, and the inorganic layers can be formed by sputtering, and so on. Further, an opposing film sheet may be formed thereon as necessary.

On the multi barrier layer or opposing film sheet layer, a coating layer is formed which improves slippage. The slippage is preferably improved by using a fluorocarbon resin for the coating layer, or by spreading spherical spacers and applying a resin layer and then permitting the spacer surface to project therefrom for point contact. The surface opposite to the flexible substrate is the surface whose slippage is improved and through which light is taken out, thus forming the backlight 2 for the liquid crystal cell 1.

The liquid crystal cell 1 and backlight 2 are fixed to one side parallel to the winding axis 9 through use of a two-sided tape or adhesive as the fixing portion 4. They may be fixed not to all the one side but to a plurality of points or one point on this side. On the surface of the liquid crystal cell 1 on the side not facing the backlight 2, the protective portion 5 is provided on the side parallel to the winding axis 9. The protective portion 5 can be formed using plastic such as an acrylic resin or ABS resin, reinforced plastic mixed with glass fibers, metal such as a Mg alloy, or the like by a method such as injection molding, press molding, or the like.

The retainer 3a has the thickness a to allow the liquid crystal cell 1 to slide in the bendable direction on the backlight 2. The retainer 3a preferably expands and contracts when wounded and is therefore preferably made of a slightly elastic material. Further, a plurality of the retainers 3a are separated by notches 3b and individually provided on the backlight 2 so as to locally transform respectively to allow mitigation of displacement when wound. In particular, the retainer 3a at the side face of the liquid crystal cell 1 is preferably made of a slightly elastic material such as a silicon resin, polyurethane resin, polystyrene, or the like. The use of the elastic material provides an effect of mitigating occurrence of a reaction force because the side portions expand or contract when bent. Besides, if the retainers 3a are divided finely by the notches 3b, a material with a low elasticity may be used when the curvature of a bend is not so small.

To the liquid crystal cell 1 and backlight 2 (precisely a four-layered structure because of the polarizing plate existing on both surfaces of the liquid crystal cell), which are fixed by the fixing portion 4 and integrated by the retainers 3a to be allowed to displace in the direction perpendicular to the winding axis 9, the retainer supporting portions 13 which integrate them to the roll 10 are fixed with an adhesive or two-sided tape. The retainer supporting portions 13 can be formed using a material similar to that of the retainers 3a. The roll 10 is accommodated in the accommodating container 7. FIG. 2 shows a configuration in which two pairs of the retainer supporting portions 13 fixed to the roll 10, but one pair or three or more pairs may be provided. The retainer supporting portions 13 and retainers 3a hold the thickness a to allow the liquid crystal cell 1 to slide between the roll 10 and the backlight 2, automatically varying the difference between the outer and inner peripheries when the display part is wound in or drawn out.

In the vicinity of the outlet port 8 in the accommodating container 7, the clamps 6 are provided which are fixed to the accommodating container 7 and hold the liquid crystal cell 1 and backlight 2 by their upper and lower surfaces to fix them. The clamps 6 are constituted of hard members entirely made of rubber, metal, or the like with a less slippery material such as rubber bonded to their tips.

Figure 3:
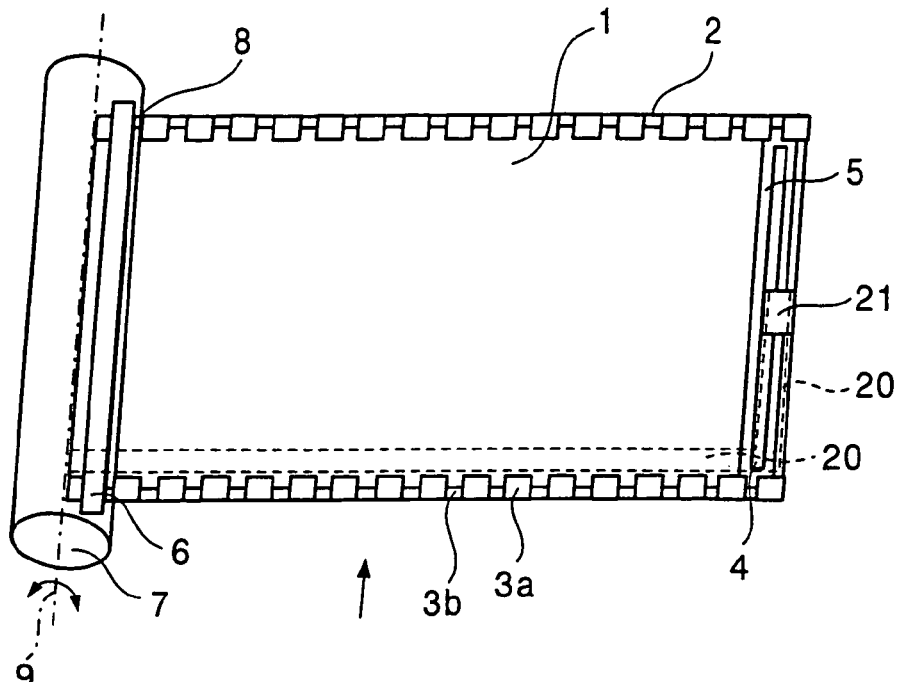
FIG. 3 is an oblique perspective view showing a signal supply unit of the active matrix type display device according to the first embodiment of the present invention.
Figure 4:
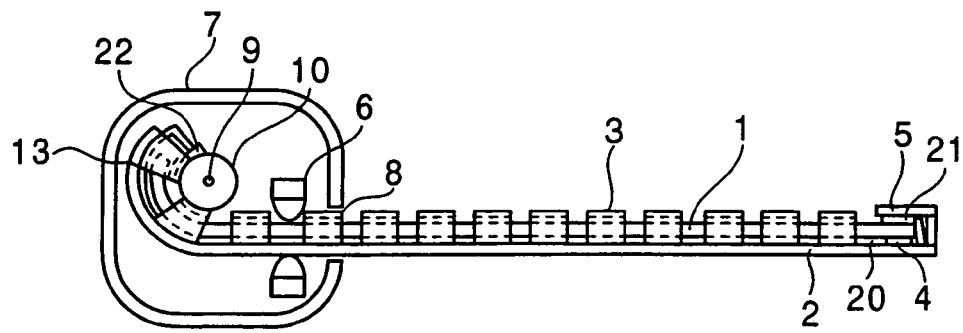
FIG. 4 is a perspective view as seen from a direction of an arrow in FIG. 3.

It should be noted that supply of signals to the liquid crystal cell 1 can be performed as shown in FIG. 3 and FIG. 4 in this embodiment. FIG. 3 is an oblique perspective view showing an example of a signal supply unit in FIG. 1, and FIG. 4 is a perspective view as seen from a direction of an arrow in FIG. 3.

The supply of signals to the liquid crystal cell 1 can be performed through use of a wiring board 20 provided on the backlight 2, a contact portion 21 provided on the liquid crystal cell 1 to establish contact with the wiring board 20, and a signal supply connector portion 22 connected to a signal supply circuit (not shown) in the accommodating container 7.

The wiring board 20, in which a flexible polyimide film on which wiring is formed, for example, of copper is bonded to the backlight 2. The contact portion 21 being a connecting portion where the liquid crystal cell 1 is connected to a drive circuit can be pressure bonded to the wiring board 20 on the backlight 2 using an anisotropic conductive sheet (ACF) in the region of the fixing portion 4 to obtain reliability of the wiring. The wiring board 20 derives signals from the contact portion 21 provided at the fixing portion 4, extends along the outer peripheral portion of the backlight 2 off the display part, and is connected to the signal supply connector portion 22 which is provided on the roll 10 in the accommodating container 7. The signal supply connector portion 22 is connected to the not shown signal supply circuit provided in the roll 10 in the accommodating container 7. The connection between the signal supply connector portion 22 and the signal supply circuit is established, with an extra margin, through connection using the flexible substrate to prevent a decrease in reliability of connection due to the winding when the display part composed of the integrated liquid crystal cell 1 and backlight 2 is wound around the winding axis 9, or through brush connection in which the electrode of the signal supply circuit on the roll 10 and a plate spring-shaped electrode or slide electrode retained by a spring are brought into contact for electrical connection. Such a connection at a portion along the drawn end enables supply of signals with a higher reliability than an electrical connection at a portion along the winding axis end where displacement occurs while winding in.

Although not shown, it is also adoptable to provide a contact portion to the liquid crystal cell 1 at a portion along the winding axis 9 end and to establish a connection using a flexible wiring board which is given play to allow the amount of the liquid crystal cell 1 displacing from the backlight 2 due to winding. In this case, the wiring board extending to the portion along the drawn end becomes unnecessary, thus making it possible to realize a flexible display device with a simpler configuration.

As described above, in this embodiment, the liquid crystal cell 1 and backlight 2 are fixed by the fixing portion 4 provided on the one side in the direction perpendicular to the bendable direction, that is, parallel to the winding axis 9, and the retainers 3a provided on both sides parallel to the bendable direction allow the display part to displace in the bendable direction while integrating it, thus making it possible to obtain flexibility while winding. The display part can be easily wound, even if the curvature radius during accommodation is made small, without an unintentional reaction force exerted on display members, resulting in a reliable accommodation-type display device which hardly becomes creased. Further, the protective portion 5 provided on the liquid crystal cell 1 at the portion along the drawn end conceals the fixing portion 4 to provide a better external appearance, and enables electrical protection and mechanical protection to prevent a break in the wiring of the electrical connecting portion.

Further, the clamps 6 are provided in this embodiment. Therefore, by clamping the two-layered plate-shaped structure (the liquid crystal cell 1 and backlight 2), it is possible to temporary fix a displacement of the two-layered plate-shaped structure and to make the structure hard to bend and increased in strength and rigidity, when the plate-shaped structure is drawn out to perform display and when it does not become stable but bends. In other words, the plate-shaped structure is flexible and easy to bend when accommodated in the accommodating container or drawn out therefrom, and exhibits strength to keep its plate shape when clamped for performance of display. In this case, the multilayer plate-shaped structure can be integrated with spaces therebetween kept unwidened because of existence of the retainers 3, and fixed by the fixing portion 4 at positions apart from the clamps 6 for strength. The clamps preferably clamp the display part after it is drawn out to substantially flat.

The clamps 6 are formed on one line perpendicular to the bendable direction including the display surface in FIG. 1, but may be provided in a point-like manner at portions around the retainers 3 on this one line. The clamps provided in the point-like manner present an advantage of leaving no press mark on the liquid crystal cell 1 and backlight 2. Linear clamping can press them more entirely than point-like clamping, thus more securely preventing deformation caused by the liquid crystal cell 1 separating upward from the backlight 2.

Clamping preferably includes, in addition to automatic fixation in conjunction with the end of drawing operation, a mode in which a user manually clamps the display part after drawing it out into a state capable of performing display.

Further, in this embodiment, the not shown polarizing plates are fixed to the liquid crystal cell 1 by the fixing portion 4 and integrated with the liquid crystal cell 1 and backlight 2 by the retainers 3 on the sides perpendicular to the fixing portion 4 to prevent occurrence of displacement. This can prevent occurrence of displacement between optical axes of the liquid crystal cell 1 and the polarizing plates during display, resulting in an excellent image quality without a decrease in contrast ratio.

The display main part includes the liquid crystal cell in this embodiment, but an electrophoretic cell, electrochemical effect cell, or the like may be used. Besides, the display secondary part includes the backlight, but a cover may be used. Further, the display main part may include an organic EL device, and the display secondary part an input tablet such as a touch input device.

A displacement between positions of the touch input device and the display main part during display and input decreases input accuracy. The fixing portion 4, which fixes the display main part and the display secondary part, provided at the drawn end as in this embodiment can prevent the display main part and touch input device from displacing from each other while they are being drawn out. Further, there is an effect that even if display or input is performed midpoint during the drawing, the displacement between pen input or touch input and display can be prevented.

Second Embodiment

Figure 5:
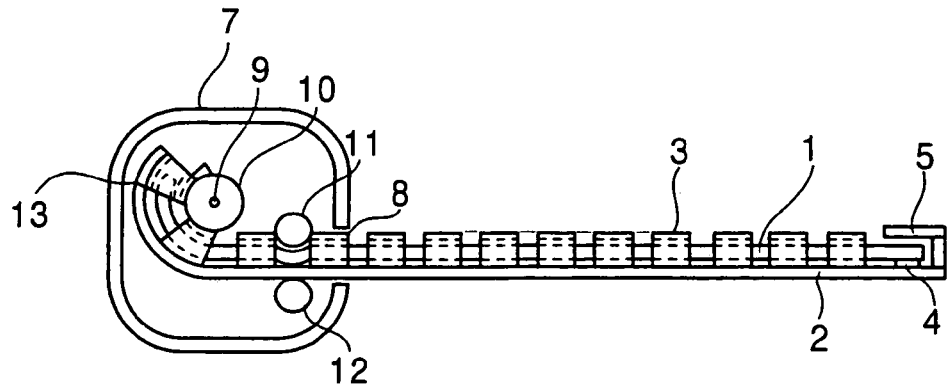
FIG. 5 is a perspective view of an active matrix type display device according to a second embodiment of the present invention.

Next, a second embodiment is described using FIG. 5. FIG. 5 is an oblique perspective view showing an active matrix type display device of this embodiment. This embodiment is described regarding points different from the first embodiment, and the descriptions of the same portions are omitted.

The active matrix type display device of this embodiment is different from that of the first embodiment in that a first rotator 11 and a second rotator 12 are provided as shown in FIG. 5 in place of the clamps 6 in FIG. 1. These rotators 11 and 12 are provided linearly and parallel to a winding axis 9, the first rotator 11 being provided in contact with a liquid crystal cell 1 and the second rotator 12 being provided in contact with a backlight 2.

When a display part in which the liquid crystal cell 1 and backlight 2 are integrated is wound in or drawn out, these rotators 11 and 12 can hold the display part therebetween and apply forces to send the display part in respective directions. By providing a slight difference between rotation angles of the first rotator 11 and the second rotator 12 while drawing out or winding in, the display part is sent in without producing a crease and reaction force caused by occurrence of displacement between the outer periphery (the backlight 2 in this case) and the inner periphery (the liquid crystal cell 1 in this case) in the accommodating container 7. Without provision of such a difference between the rotation angles, the force of the rotators 11 and 12 to hold the display part therebetween can be adjusted to create displacement between the outer periphery and inner periphery, thereby forming a state in which no reaction force is produced.

When the display device is not drawn out or wound in, the first rotator 11 and second rotator 12 is made spatially closer to press the liquid crystal cell 1 and backlight 2 from above and below so that the display device is made hard to bend so as to exhibit strength as in the first embodiment. On the other hand, while drawing out and winding in, it is preferable that the first rotator 11 and second rotator 12 are not in contact with the retainers 3. Accordingly, the first rotator 11 and second rotator 12 are preferably provided at a middle portion between the sides where the retainers 3 are provided. One pair or a plurality of pairs of the first rotator 11 and second rotator 12 maybe provided.

Besides, when either of the liquid crystal cell 1 and backlight 2 is softer and elastic and therefore easy to produce a crease or bend, a mechanism may be provided which slightly rotates only one of the first rotator 11 and second rotator 12 after they are drawn out for display, sends it out to flatten a crease or bend, and then clamps them. Such a configuration can provide the flat surface with strength to stably hold it during display. It is preferable for a user to be able to manually adjust the sending.

The rotators 11 and 12 can be made using rubber which is formed around a shaft made of metal or plastic.

Figure 6:
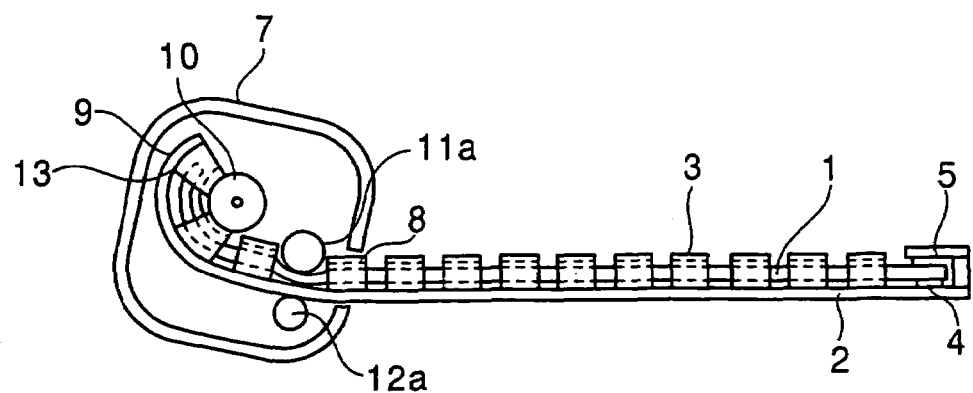
FIG. 6 is a perspective view of an active matrix type display device according to a modification of the second embodiment of the present invention.

It should be noted that when the installation position of the roller 10 in the accommodating container 7 is shifted upward, as shown in FIG. 6, from the plane when the display part is drawn out, the amount of sending while winding in or drawing out the display part can be adjusted by varying diameters of the first rotator 11 and second rotator 12. In the case of FIG. 6, the radius of the first rotator 11 is made larger than the radius of the second rotator 12, and the rotation angles of the rotators 11 and 12 and the rotation angle of the roller 10 can be determined in a ganged manner using gears and belts, thereby automatically determining the sending amount by which no bend is produced.

Incidentally, the example in which the clamp is preformed on the line in parallel to the winding axis is shown, but the clamp may be performed on the side perpendicular to the winding axis, two axes of the parallel line and perpendicular side, or surface. The clamp of the surface will be shown in a tenth embodiment hereinafter.

Third Embodiment

Figure 7A:
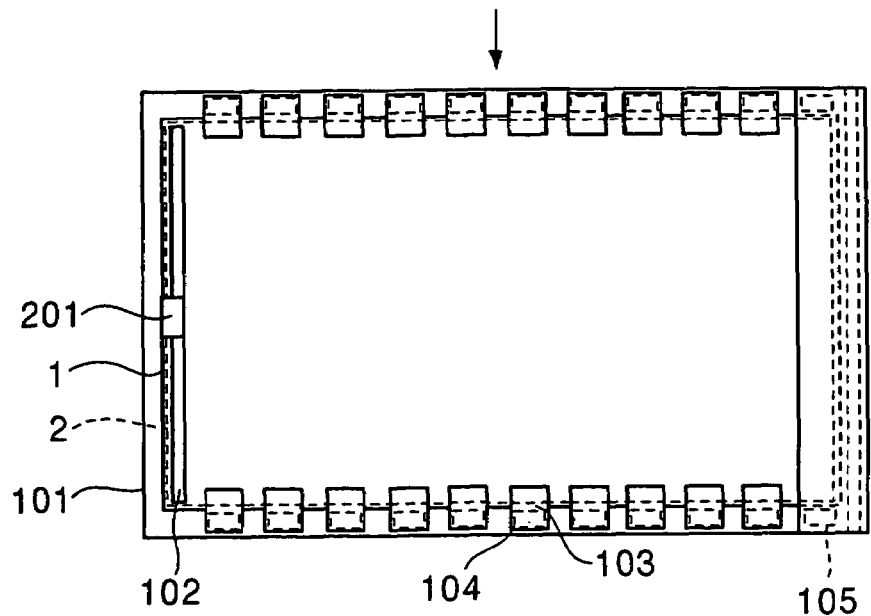
FIG. 7A is a plane view of an active matrix type display device according to a third embodiment of the present invention.
Figure 7B:
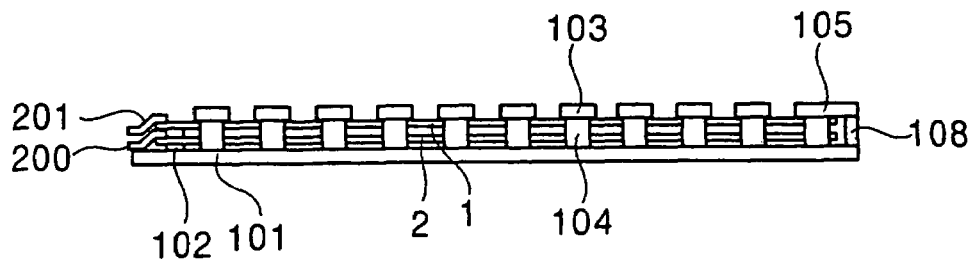
FIG. 7B is a side view as seen from a direction of an arrow in FIG. 7A.
Figure 8A:
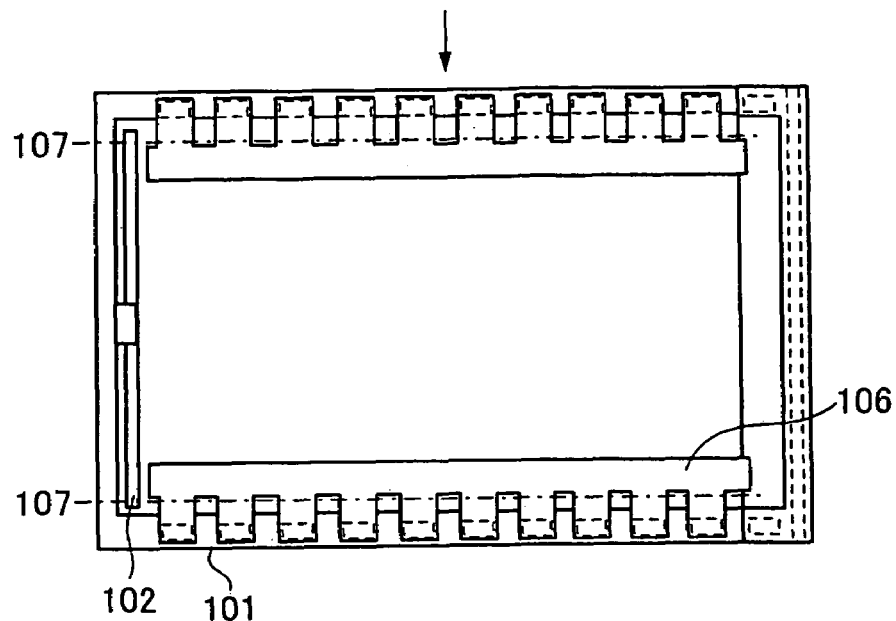
FIG. 8A is a plane view showing a manufacturing method of the active matrix type display device according to the third embodiment of the present invention.
Figure 8B:
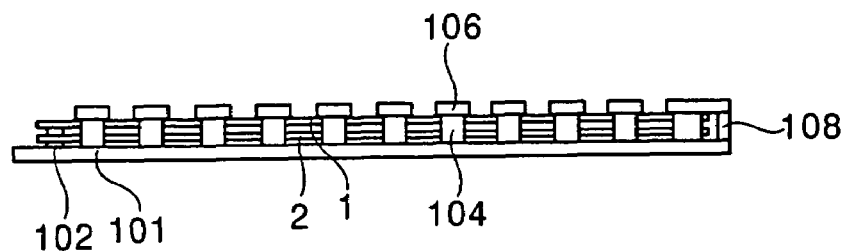
FIG. 8B is a side view as seen from a direction of an arrow in FIG. 8A.

Next, a third embodiment is described using FIGS. 7A and 7B. FIG. 7A is a plane view showing an active matrix type display device according to this embodiment, and FIG. 7B is a side view as seen from a direction of an arrow in FIG. 7A. Further, in this embodiment, a manufacturing process of a retainer 3 described in the first embodiment is also explained using FIGS. 8A and 8B. FIG. 8A is a plane view showing a manufacturing method of a retainer of the active matrix type display device of this embodiment, and FIG. 8B is a side view as seen from a direction of an arrow in FIG. 8A. As for FIGS. 7A and 7B and FIGS. 8A and 8B, although the illustration and description regarding an accommodating container 7 including a roller 10 are omitted, the left side is the winding axis end and the right side is the display part drawn end in these drawings. This embodiment is described regarding points different from the first embodiment, and the descriptions of the same portions are omitted.

The active matrix type display device of this embodiment is different from that of the first embodiment in that a pressure sensitive input pad (a display secondary part) 1 is used as a first thin plate, an organic EL cell (a display main part) 2 is used as a second thin plate, and a cover (display secondary part) 101 is provided as a third thin plate. Further, this embodiment is also different from the first embodiment in that a fixing portion 102 is provided on a side parallel to the winding axis of the display part.

As shown in FIGS. 7A and 7B, in this embodiment, the pressure sensitive input pad 1, organic EL cell 2, and cover 101 are stacked one upon the other, and the pressure sensitive input pad 1 and organic EL cell 2, and the organic EL cell 2 and cover 101 are fixed respectively by the fixing portion 102 along the winding axis end (the left side in the drawings). The cover 101 is formed to be larger than the pressure sensitive input pad 1 and organic EL cell 2, and a number of retaining spacers 104 are formed in a peripheral region on the cover 101 around the pressure sensitive input pad 1 and organic EL cell 2. The retaining spacer 104 has a height that is the sum of the heights of the pressure sensitive input pad 1 and organic EL cell 2 with addition of a margin for a slide. On each of the retaining spacers 104, a flexible retaining film 103 is formed and partially covers the surface of the pressure sensitive input pad 1. The retaining film 103 and retaining spacer 104 form a retainer (a close contact member). The retaining films 103 are separated for the retaining spacers 104 on a one-by-one basis, thus exhibiting a retaining function without producing a crease while bending.

Besides, in this embodiment, derivation of signals from the pressure sensitive input pad 1 and supply of signals to the organic EL cell 2 are performed through use of connection pads (not shown) respectively provided near the fixing portion 102 along the winding axis end without leading wiring. As for the derivation of signals from the pressure sensitive input pad 1, connection to a circuit board (not shown) can be reliably established via the connection pad through a flexible wiring 201. As for the supply of signals to the organic EL cell 2, connection to the circuit board (not shown) can be reliably established via the connection pad through a flexible wiring 200.

Further, in this embodiment, a protecting spacer 108 made of a material similar to that of the retaining spacer 104 is formed on the side along the drawn end on the cover 101, and a protecting film 105 in the film form is provided on the protecting spacer 108 to cover the side along the drawn end of the pressure sensitive input pad 1. The protecting spacer 108 and protecting film 105 form a protective portion. Alternatively, a film may be folded to form the protecting portion which serves as both the protecting spacer and protecting film.

Since the fixing portion 102 is provided along the winding axis end in this embodiment, there occurs displacement between the cover 101, pressure sensitive input pad 1, organic EL cell 2 at the drawn end while winding in and drawing out. Hence, this protective portion is given a width to allow this displacement, and this is explained using FIG. 9.

Figure 9:
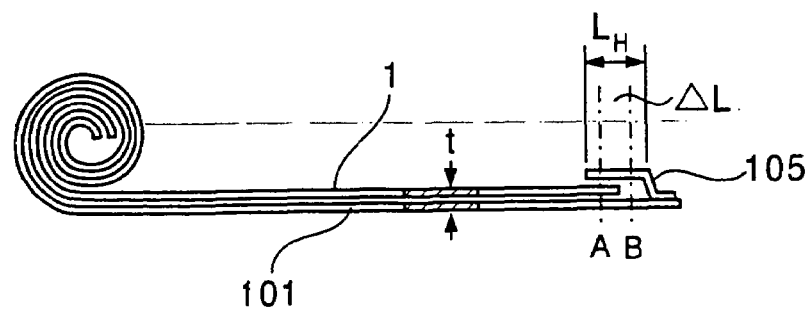
FIG. 9 is a cross-sectional view for explaining the width of a protective portion.

FIG. 9 shows a schematic diagram of a configuration having the pressure sensitive input pad 1 and cover 101 rolled midway. In FIG. 9, the illustration of an accommodating container and so on is omitted. The protecting portion is formed by folding the protecting film 105. Assuming that the tip position of the pressure sensitive input pad 1 when the cover 101 and pressure sensitive input pad 1 are drawn and spread out flat is A, and the tip position when all of them are wound into a roll is B, a width $L_H$ created by adding a margin of the tip and a margin of the cover to a distance $\Delta L$ between A and B can be regarded as the width of the cover. The displacement $\Delta L$ is $t\theta$ where the distance between centers of respective plate thicknesses of the pressure sensitive input pad 1 and cover 101 is t and the winding angle is $\theta$ (radian). In the case of n rotations, a displacement of $2\pi nt$ needs to be taken into consideration. Further, $L_H$ is preferably about 1.2 to about 2 times $\Delta L$.

Next, a manufacturing method of the active matrix type display device of this embodiment is described.

First, as for a forming method of the pressure sensitive input pad 1, an adhesive transparent insulator (with a thickness of 1 μm to 20 μm) in a mesh form is formed on a film substrate with a thickness of 50 μm to 200 μm on which transparent electrodes are formed. Then, a film with a thickness of 5 μm to 20 μm having transparent electrodes formed on its surface is bonded to the film substrate with respective surfaces formed with the transparent electrodes facing each other, thus forming the pressure sensitive input pad 1. The film substrate and film may be made of PET, PES, or the like. The mesh is made to have a relatively small opening such as 30% to 70% so as to be touched with a force locally applied by a pen tip or fingertip. It is also possible to form a scratch resisting hard-coated layer or an antireflection layer on the film.

A manufacturing method of the organic EL cell 2 of the active matrix type is described. The rear face of the array substrate of the active elements is the surface (a display surface) in contact with the pressure sensitive input pad 1. The array substrate in use is, as in the first embodiment, one in which a TFT array is transferred to the array substrate composed of a plastic substrate by the transfer method, and a polymer organic EL layer can be formed by the inkjet method. The array substrate in use has a thickness of 0.1 mm to 0.15 mm and is made of a transparent UV curing resin having a low linear expansion coefficient.

Further, the cover 101 includes a substrate made of a flexible material and protects a surface on the organic EL cell 2 side. Further, the cover 101 has a structure to provide mechanical strength when the display part in which the pressure sensitive input pad 1, organic EL cell 2, and cover 101 are integrated is drawn out. Usable materials for the cover 101 include a thin metal plate and plastic substrates of PEN, PET, PC, and other plastics, and these materials with coloring, metal coating, and so on can be used.

As a forming method of the retainer (the retaining film 103 and retaining spacer 104), a method as shown in FIGS. 8A and 8B can be used. Specifically, the retaining spacers 104 are adhered to respective comb teeth of a belt-shaped plastic film 106 having comb teeth which are longer than the length to be used as the retainers, and the plastic film 106 is aligned with and bonded to the cover 101 on which the pressure sensitive input pad 1 and organic EL cell 2 are layered. Thereafter, the plastic film 106 can be cut at a cut position 107 into a necessary length as the retaining film 103, resulting in separated retainers. This allows accurate and easy formation of many retainers. As the retaining film 103, usable films are PET, PC, vinyl chloride resin, acryl, PES, PEN, PEEK, and the like with a thickness of 50 µm to 150 µm. Besides, as the retaining spacer 104, acryl, epoxy, silicon, rubber, and the like can be used.

In this embodiment, since the fixing portion 102 exists along the winding axis end, displacement rarely occurs inside the accommodating container when the display part is wound in, thus easily preventing occurrence of a crease due to repeat of winding in and drawing out. Further, the existence of the fixing portion 102 along the winding axis end enables signal supply and signal derivation at the winding axis end with reliability to eliminate the necessity of leading wiring and so on.

Furthermore, this embodiment includes the cover 101 which keeps mechanical strength while drawing. When the cover 101 is provided, the cover 101 can receive deformation expanded by a drawing force and therefore prevent a reaction force from acting on the members such as the display part, input mechanism, backlight, and so on. In particular, when the active elements are formed by transfer, unintentional tensile deformation occurring on the substrate surface causes breakage defect or a decrease in reliability. However, by providing a plate-shaped structure (a cover) different from the plate-shaped structure including the active matrix substrate as a member on which the force while drawing is exerted, excellent display can be attained.

Fourth Embodiment

Figure 10:
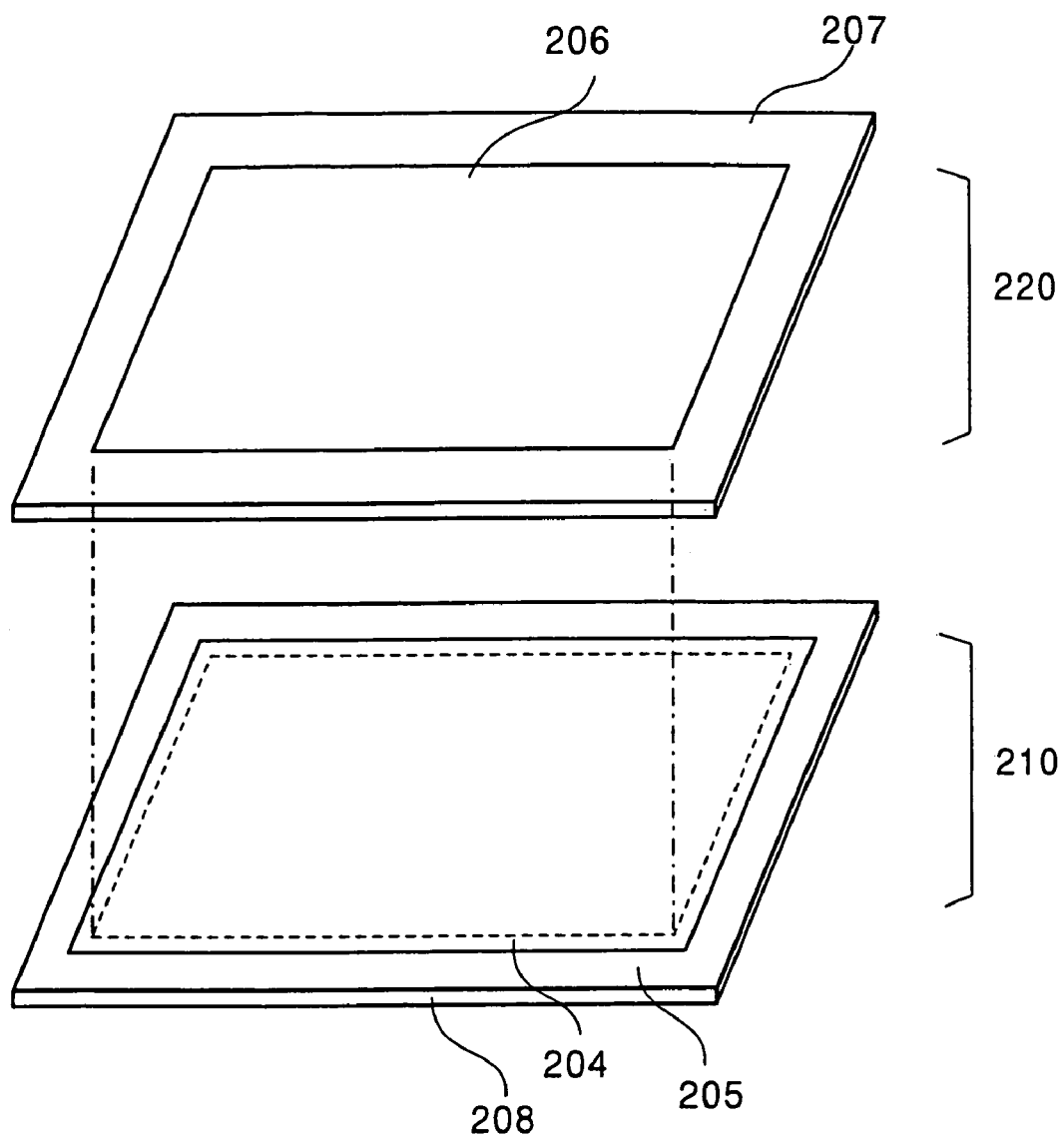
FIG. 10 is an oblique perspective view for explaining the relationship between sizes of a first thin plate and a second thin plate of an active matrix type display device according to a fourth embodiment of the present invention.
Figure 11:
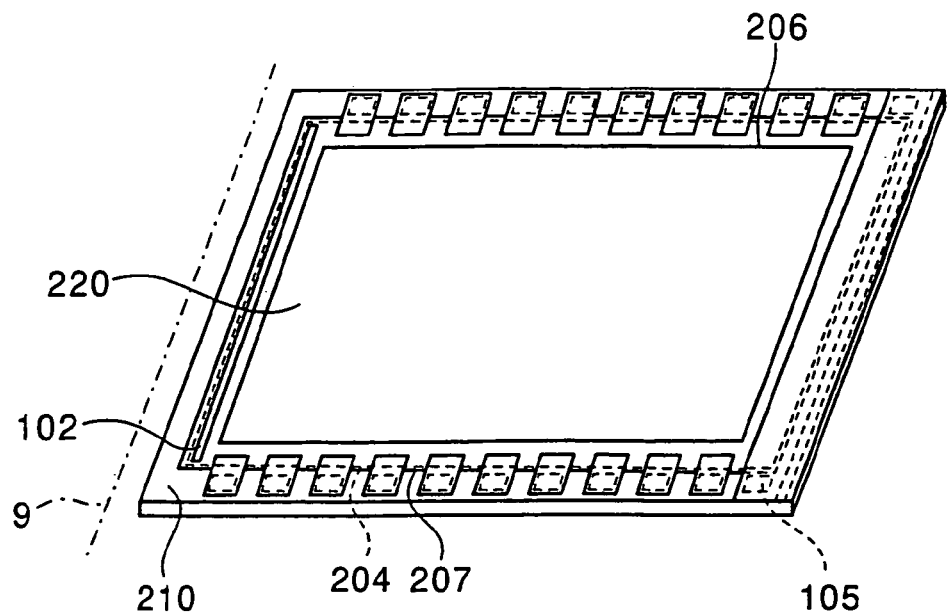
FIG. 11 is an oblique perspective view of the active matrix type display device according to the fourth embodiment of the present invention.

Next, a fourth embodiment is described using FIG. 10 and FIG. 11. FIG. 10 is an oblique perspective view for explaining the relationship between a first thin plate and a second thin plate of an active matrix type display device of this embodiment when they are stacked one upon the other, and FIG. 11 is an oblique perspective view of the active matrix type display device of this embodiment.

In this embodiment, for combining a liquid crystal cell, electrophoretic cell, or the like (a display main part) with a backlight (a display secondary part), respective sizes thereof are described.

As shown in FIG. 10, a backlight 210 includes a light emitting portion 204 which is an organic EL layer or the like and a light shield portion 205 therearound. The light shield portion 205 may be realized by forming a thin film such as a black resin which is used for forming the organic EL layer over the whole light shield layer 205, or by bonding a light shield sheet. Light shield is necessary not only at the light shield portion 205 but also at an end face 208 and rear face (a surface on the side not facing the display main part).

A display main part 220 is constituted of a display area 206 and a light shield region 207 therearound. As shown in FIG. 10, the display area 206 can be made smaller than the light emitting portion 204 of the backlight 210, thereby obtaining sufficiently high emission intensity. Further, a similar light shield region is preferably provided also on a surface facing the backlight 210. The light shield region 207 is preferably a layer of a type of not only shielding light but also absorbing light (black).

These display main part 220 and backlight 210 are stacked one upon the other to form the active matrix type display device according to this embodiment as shown in FIG. 11. In the drawing, a winding axis 9 exists on the left side, and the illustration of an accommodating container is omitted. Although retainers are provided also in this embodiment to prevent an increase in distance between the display main part 220 and backlight 210, a little margin may cause a space between the display main part 220 and backlight 210. In this event, a sufficient distance from the end portion of the light emitting portion 204 to the end portion of the light shield region 207 could substantially prevent light leakage.

To prevent light leakage, the retaining spacer which has been described in the third embodiment is, more preferably, made black. It is also effective to make the width of the retaining spacer in the bendable direction greater than the width of the retaining film to prevent light leakage from the direction of the end face 208 in FIG. 10 to enhance the light shielding function. Depending on the material and the diameter of the accommodating container, substantially eliminating the space between the retaining spacers is more preferable in order to prevent light leakage.

Fifth Embodiment

Figure 12A:
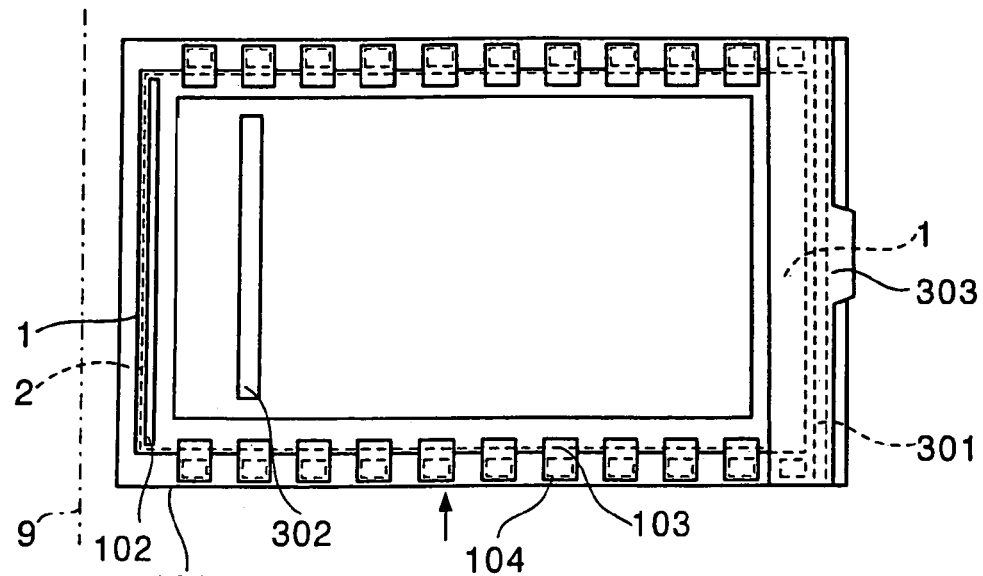
FIG. 12A is a plane view of an active matrix type display device according to a fifth embodiment of the present invention.
Figure 12B:
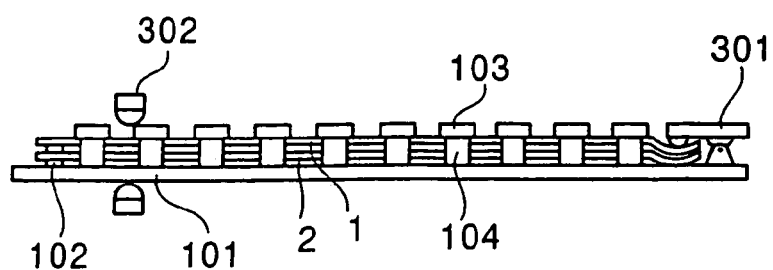
FIG. 12B is a side view as seen from a direction of an arrow in FIG. 12A.

Next, a fifth embodiment is described using FIGS. 12A and 12B. FIG. 12A is a plane view showing an active matrix type display device of this embodiment, and FIG. 12B is a side view as seen from a direction of a narrow in FIG. 12A. Although the illustration and description regarding an accommodating container 7 including a roller 10 are omitted in FIGS. 12A and 12B, the left side is a winding axis 9 end and the right side is the display part drawn end in the drawings. This embodiment is described regarding points different from the third embodiment, and the descriptions of the same portions are omitted.

This embodiment is different from the third embodiment in that a clip-shaped protective portion 301 as shown in FIGS. 12A and 12B is provided in place of the protective portion (the protecting film 105 and protecting spacer 108) in FIGS. 7A and 7B. Usually, a first thin plate 1 and a second thin plate 2 are held by the clip-shaped protective portion 301, or by the projecting portion provided at the end portion of the protective portion 301 and a third thin plate 101. By grasping a knob 303, the force of the clip-shaped protective portion 301 to press the first thin plate 1 and second thin plate 2 is released to allow these to displace from each other. Further, a latch mechanism, which fixes a plate spring in such a manner that the spring is hooked to a groove, is used at the display part in order to exert a winding force using the spring and to prevent the display part from rewinding while drawn out. The latch mechanism is configured such that upon detection of a release state of this clip, the latch mechanism at the winding axis 9 end is released in conjunction therewith for the display part to rewind. Accordingly, the plurality of plate-shaped structures can be fixed to both ends of the fixing portion 102 along the winding axis end and the clip-shaped protective portion 301 along the drawn end, thus making the display part rigid and easy to view.

Further, clamps 302 may be provided near an outlet (not shown) of the accommodating container also in this embodiment. Thereby, the display part can be fixed on both the sides of the screen even when it performs display in a state of being drawn out midway, and therefore can obtain strength.

Sixth Embodiment

Figure 13A:
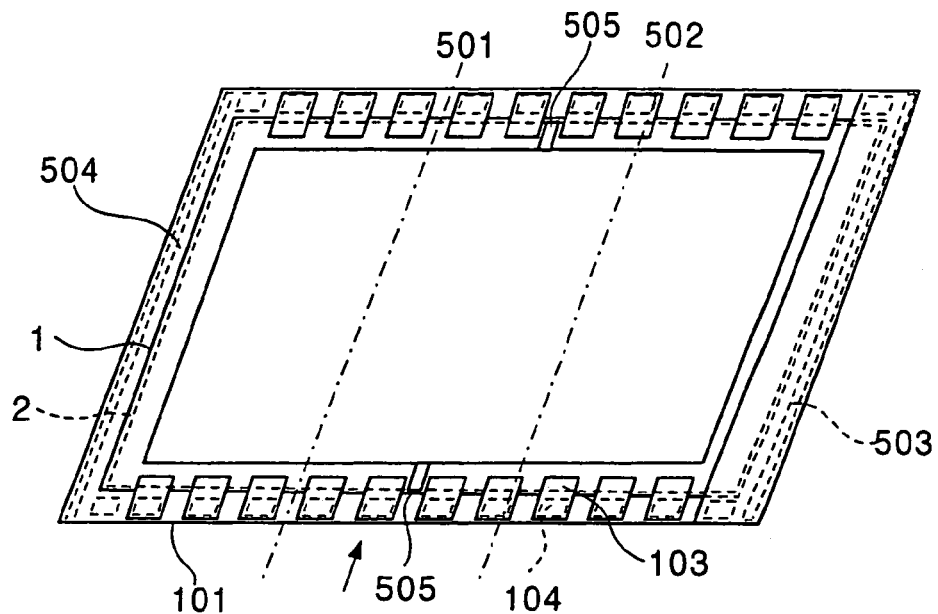
FIG. 13A is an oblique perspective view of an active matrix type display device according to a sixth embodiment of the present invention.
Figure 13B:
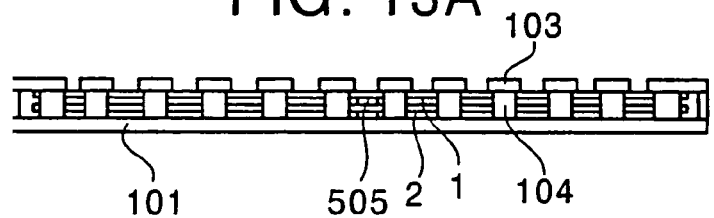
FIG. 13B is a side view as seen from a direction of an arrow in FIG. 13A.
Figure 14:
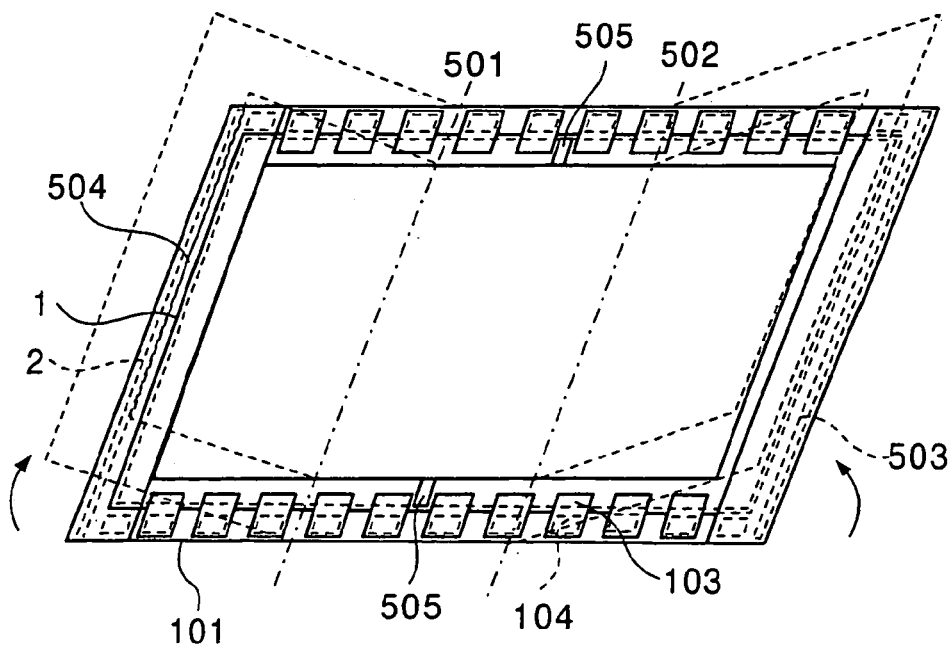
FIG. 14 is an oblique perspective view for explaining the way of bending the active matrix type display device according to the sixth embodiment of the present invention.
Figure 15:
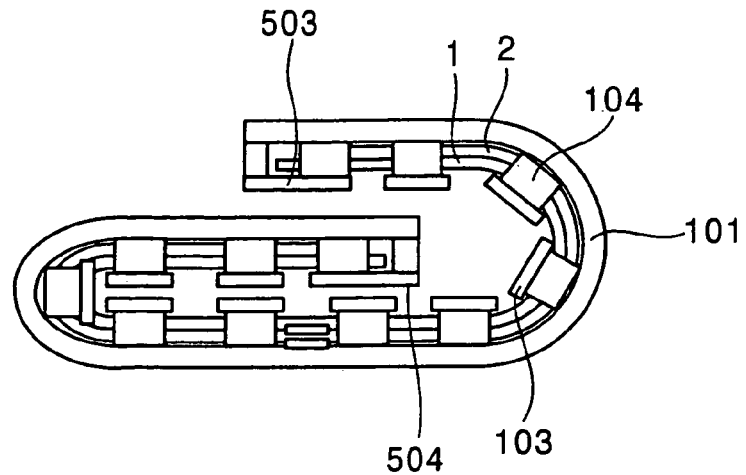
FIG. 15 is a side view for explaining the state of the substantially bent active matrix type display device according to the sixth embodiment of the present invention.

Next, a sixth embodiment is described using FIGS. 13A and 13B to FIG. 15. FIG. 13A is an oblique perspective view showing an active matrix type display device of this embodiment, and FIG. 13B is a side view as seen from a direction of an arrow in FIG. 13A. FIG. 14 is an oblique perspective view for explaining the way of bending the active matrix type display device of this embodiment, and FIG. 15 is a side view for explaining the state thereof substantially bent. This embodiment is described regarding points different from the third embodiment, and the descriptions of the same portions are omitted.

This embodiment shows a form of the display device suitable for accommodation not by winding but by folding it. This embodiment is the same as the third embodiment in that its display part includes a first thin plate 1, a second thin plate 2, and a third thin plate 101, and that retainers include retaining films 103 and retaining spacers 104. This embodiment, however, is different from the third embodiment in that a first protective portion 503 and a second protective portion 504 are respectively provided on both sides perpendicular to sides where the retainers are provided, and that fixing portions 505 are provided on the middle of both the sides where the retainers are provided.

This configuration allows a first bend position 501 and a second bend position 502 to be provided at positions where the sides provided with the retainers are divided into substantially equal three portions and the display part to be bent as shown in FIG. 14 while the components of the display part are fixed to each other at the middle where the fixing portions 505 exist. A side view of the display part which is nearly fully folded into three portions is FIG. 15.

In bending as shown in FIG. 14 and FIG. 15, there occurs displacement in the display part, that is, between the first thin plate 1, second thin plate 2, and third thin plate 101, but a slide allowed by the retainers (the retaining films 103 and retaining spacers 104), the first protective portion 503, and the second protective portion 504 enables a flexible bend without producing a crease therein. Further, the fixation by the fixing portion 505 at the middle portions on the sides where the retainers are provided eliminates displacement in the substantially opened display part, and provides an excellent accuracy. The display part folded into three portions requires only 360 degrees of bend angle in total, so that deformation to the bent portion of the display part can be made smaller than in the case of winding the display part. When the curvature radius of a bend is made small, the retaining spacers 104 are made thick so that the retaining spacers 103 come into contact with each other to thereby prevent a bend beyond a limit.

Seventh Embodiment

Figure 16:
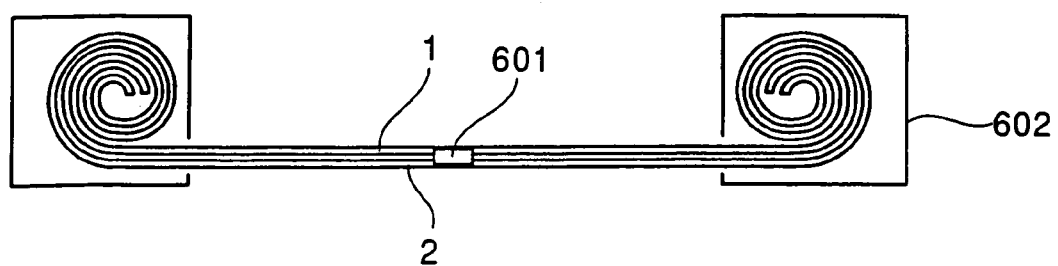
FIG. 16 is a cross-sectional view of an active matrix type display device according to a seventh embodiment of the present invention.

Next, a seventh embodiment is described using FIG. 16. FIG. 16 is a cross-sectional view of an active matrix type display device of this embodiment. This embodiment is described regarding points different from the sixth embodiment, and the descriptions of the same portions are omitted.

This embodiment has a configuration, the same as that in FIGS. 13A and 13B, in which a first protective portion and a second protective portion (not shown) are respectively provided on both sides perpendicular to sides where retainers are provided, and fixing portions 601 are provided at the middle on both the sides where the retainers are provided as in the sixth embodiment. This embodiment, however, is different from the sixth embodiment in that this is not accommodated in a folded form but accommodated in such a form that it is wound from both the sides where the protective portions are provided. FIG. 16 is a cross-sectional view as seen from the direction of the arrow in FIG. 13A, in which the illustration of the third thin plate 101 is omitted. This embodiment is configured such that accommodating containers 602, which have been described in the first embodiment, are provided respectively on the side where the first protective portion is provided and the side where the second protective portion is provided to wind the display part from both sides.

Also in this embodiment, the fixing portions 601 can be provided at and fixed to the middle portions of the sides where the retainers are provided so that the display part is wound in and drawn out in right and left directions, resulting in a structure capable of preventing displacement of the display part, and bendable.

Eighth Embodiment

Figure 17A:
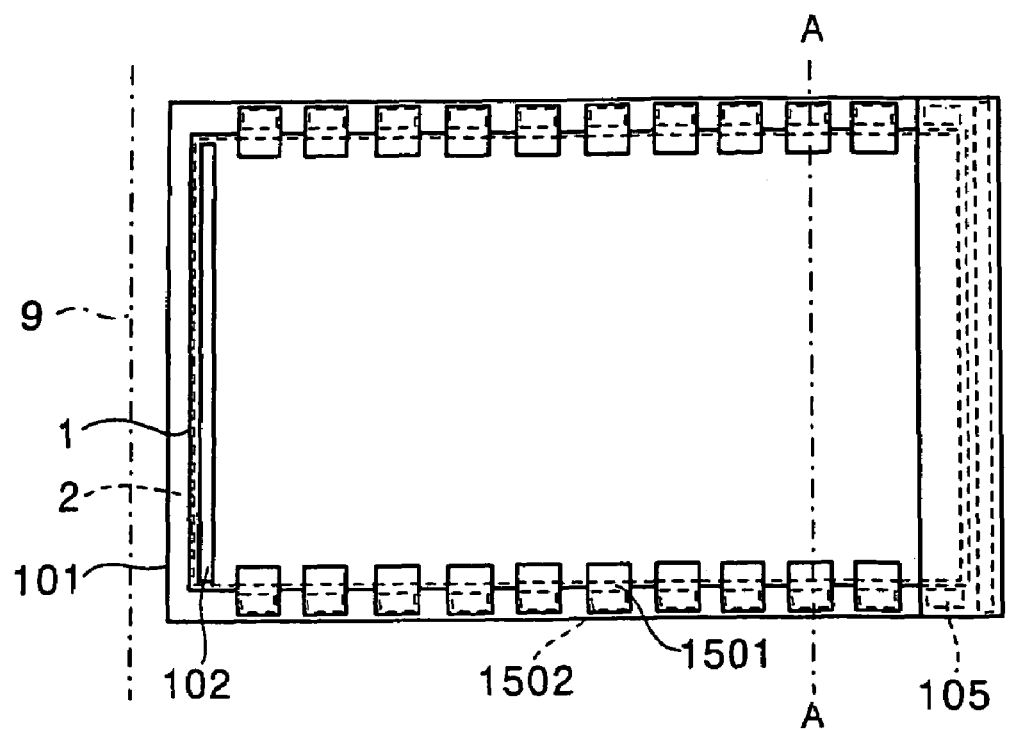
FIG. 17A is a plane view of an active matrix type display device according to an eighth embodiment of the present invention.
Figure 17B:
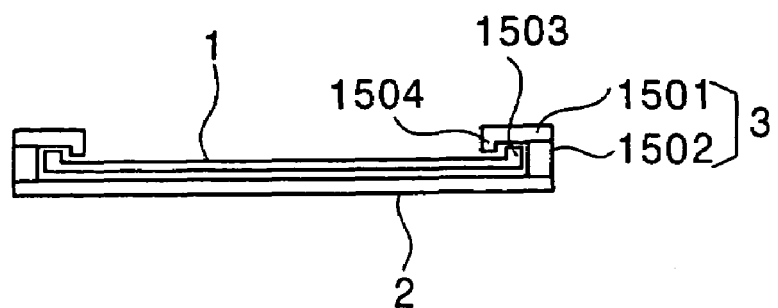
FIG. 17B is a cross-sectional view taken along a line A–A' in FIG. 17A.

Next, an eighth embodiment is described using FIGS. 17A and 17B. FIG. 17A is a plane view showing an active matrix type display device of this embodiment, and FIG. 17B is a cross-sectional view taken along a line A–A' in FIG. 17A. This embodiment is described regarding points different from the third embodiment, and the descriptions of the same portions are omitted.

This embodiment is different from the third embodiment in that a display part includes two layers, a first thin plate 1 and a second thin plate 2, and that the shape of retainers and the shape of sides of the first thin plate 1 along the retainer sides are given specific features.

In this embodiment, as shown in FIG. 17B, a retainer includes a retaining spacer 1502 and a retaining plate 1501 provided thereon, and the retaining plate 1501 has at its end a projection 1504 which is provided toward the first thin plate 1. Further, the first thin plate 1 has at its side to be bent (a side where the retainer is provided) a projection 1503, which is provided on a surface thereof on the side not facing the second thin plate 2 and toward the retainer, the projection 1503 being sandwiched between the retaining spacer 1502 and retaining projection 1504. The projections 1503 and 1504 may be formed by folding the respective structures into integral forms, or may be embodied respectively by fixing separately formed elements. Since the provision of the projections 1503 and 1504 increases the thickness, it is preferable to use a slightly flexible material (for example, hard rubber, polyethylene, or the like) especially when forming them on the entire sides of the first thin plate 1. These projections have thicknesses such that when the first thin plate 1 tries to displace right or left in the drawing, it is not allowed to displace due to the projections engaged with each other as shown in FIG. 15B. As a result, when the first thin plate 1 tries to separate upward from the second thin plate 2 due to a bend, a force to inhibit the separation act thereon, and the second thin plate 2 also follows it to bend, so that the space between both the surfaces cannot be increased. This embodiment has the two-layered structure including the first thin plate 1 and second thin plate 2, but it may have a multi-layered structure as long as projections are formed at a layer closest to the retainers.

Ninth Embodiment

Figure 18A:
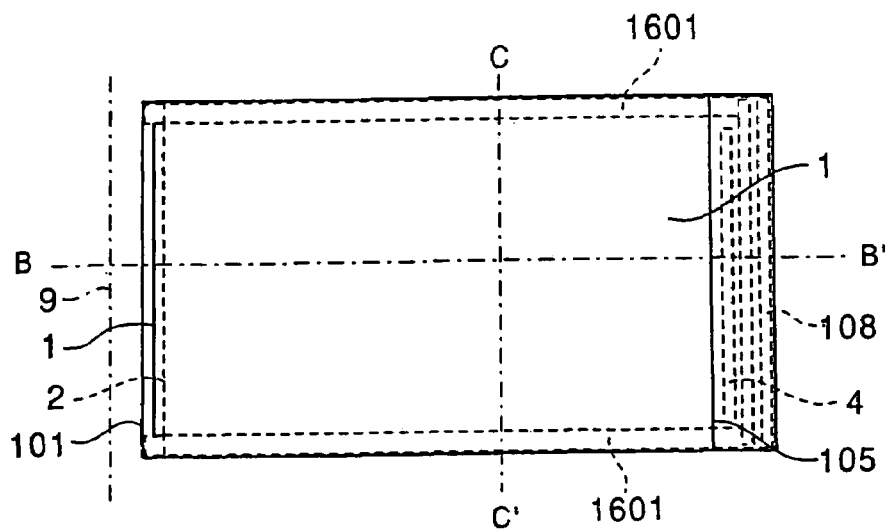
FIG. 18A is a plane view of an active matrix type display device according to a ninth embodiment of the present invention.
Figure 18B:
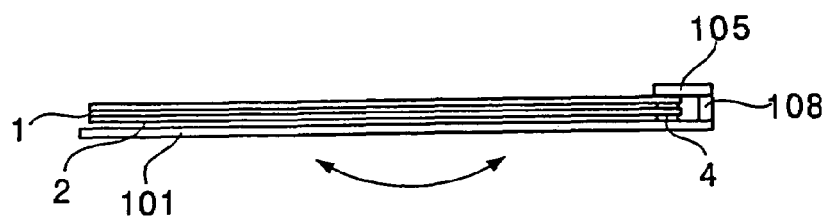
FIG. 18B is a cross-sectional view taken along a line B–B' in FIG. 18A.
Figure 18C:
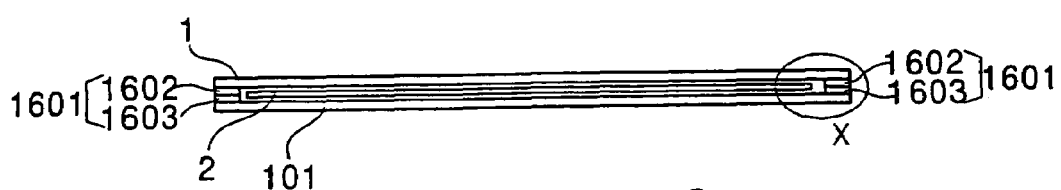
FIG. 18C is a cross-sectional view taken along a line C–C' in FIG. 18A.
Figure 18D:
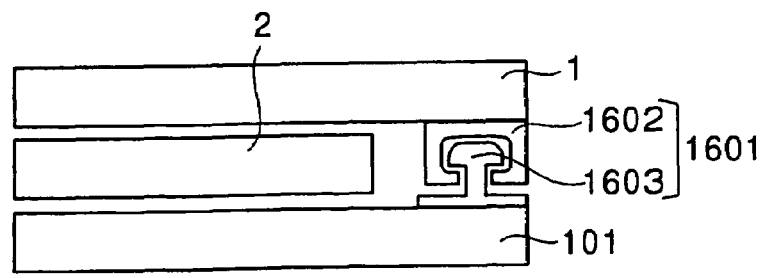
FIG. 18D is an enlarged view of an enclosed region X in FIG. 18C.

Next, a ninth embodiment is described using FIGS. 18A to 18D. FIG. 18A is a plane view showing an active matrix type display device of this embodiment, FIG. 18B is a cross-sectional view taken along a line B–B' in FIG. 18A, FIG. 18C is a cross-sectional view taken along a line C–C' in FIG. 18A, and FIG. 18D is an enlarged view of an enclosed region X in FIG. 18C. This embodiment is described regarding points different from the first, third, and fifth embodiments, and the descriptions of the same portions are omitted.

This embodiment is the same as the third embodiment in that a first thin plate 1, a second thin plate 2, and a third thin plate 101 are layered, and as the first embodiment in that a fixing portion 4 is provided on a side opposite to a winding axis 9. As shown in FIG. 18B, this embodiment is the same as the fifth embodiment in that a protective portion, which is fixed by the fixing portion 4 and protects end portions of the first thin plate 1, second thin plate 2, and third thin plate 101, includes a protecting spacer 108 and a protecting film 105 provided thereon.

In this embodiment, as shown in FIG. 18D, a retainer (a close contact member) 1601 includes a first retaining member (a first close contact member) 1602 fixed to the first thin plate 1 and a second retaining member (a second close contact member) 1603 fixed to the third thin plate 101. The second retaining member 1603 extends in a rail form in the right-to-left direction (a bendable direction) in FIG. 18A, and its cross section has a thin base and a portion thereon laterally wide in the cross-sectional view. The first retaining member 1602 forms a structure to hold the wide portion of the second retaining member 1603 on right and left sides in the cross-sectional view, and also catch, in a claw manner, the portion (a base) under the wide portion of the second retaining member 1603. It is preferable to use, as the retaining members 1602 and 1603, a resin such as polyethylene and vinyl chloride resin, which is flexible, has an appropriate hardness capable of holding its shape, and provides good slidability. The fixation between the first retaining member 1602 and first thin plate 1, and between the second retaining member 1603 and third thin plate 101 may be realized with a soft adhesive, or by thermal fusion or solvent fusion. Depending on the material, they may be integrally formed.

The first retaining member 1602 and second retaining member 1603 are in a loose engagement (fit) as shown in FIG. 18D to move slidably. In FIG. 18D, when trying to separate upward and downward, the first thin plate 1 and third thin plate 3 never separate from each other because the holding portions are fit each other but they can slide in the right-to-left direction in FIG. 18A, so that a structure can be obtained in which the components of the display part displace from each other without increasing the space therebetween.

Since the first retaining member 1602 on the catch side of the retainer 1601 has a structure to hold the second retaining member 1603 between its two walls, an opening (the lower side in FIG. 18D) of the first retaining member 1602 is preferably directed to the outer periphery side of a bend. This direction is shown by an arrow in FIG. 18B. A reverse bend of the display part exerts a force to widen this opening, leading to a possibility of releasing their fit.

Besides, in the same manner as the third embodiment, the first thin plate, the second thin plate and the third thin plate may be the input pad, the display cell and the cover, respectively. However, they may be a cover in which display part is transparent, a display cell and a back cover, respectively, or they may be a polarizing plate, a liquid crystal cell and a backlight, respectively. Moreover, it is not limited to three layers, but it may be equal to or more than four layers, such as a cover, a polarizing plate, a liquid crystal cell, a polarizing plate, a backlight and a cover. In these cases, the first close contact member and the second close contact member can be provided at the most outer thin plates, respectively.

Figure 19A:
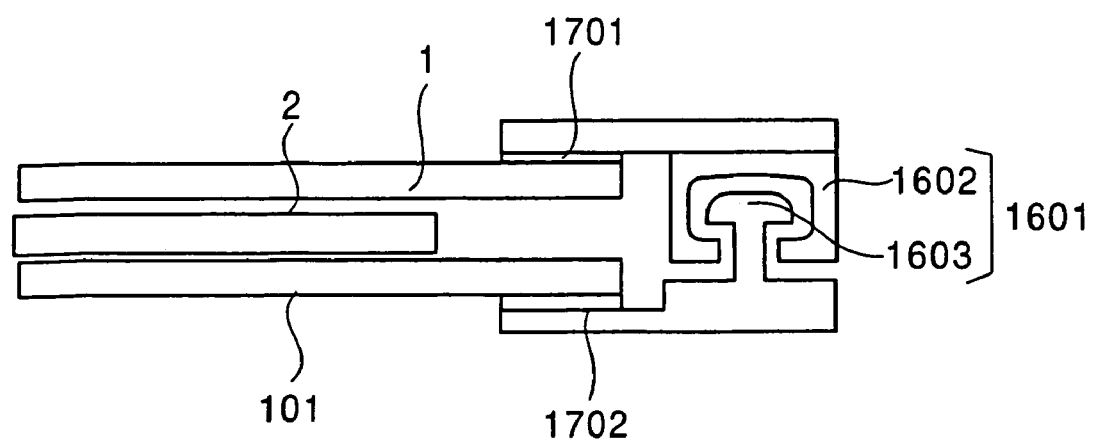
FIG. 19A is a cross-sectional view of the active matrix type display device according to a modification of the ninth embodiment of the present invention, and an enlarged view of its retainer portion.

FIG. 19A shows a modification of this embodiment. FIG. 19A is, corresponding to FIG. 18D, an enlarged cross-sectional view of a retainer portion. The first retaining member 1602 and second retaining member 1603 held between the first thin plate 1 and third thin plate 101 may increase the space therebetween. The space between the first thin plate 1 and third thin plate 101, however, can be adjusted by joining the first retaining member 1602 and second retaining member 1603 to joint portions 1701 and 1702 which are formed on outer surfaces of the first thin plate 1 and third thin plate 101 respectively as shown in FIG. 19A.

Not only the retainers 1601 as in FIGS. 18A to 18D and FIG. 19A are provided on bendable sides, but also short retainers in the same direction as that of the retainers 1601 may be provided at a plurality of points on sides perpendicular to these sides. For example, in the configuration to allow displacement at the drawn end as in the third embodiment, the plate-shaped members are hard to integrate and easy to separate upward only by being retained by the protective portion, but the short retainers provided at several points around the protective portion can restrain the upward separation while allowing displacement.

Figure 19B:
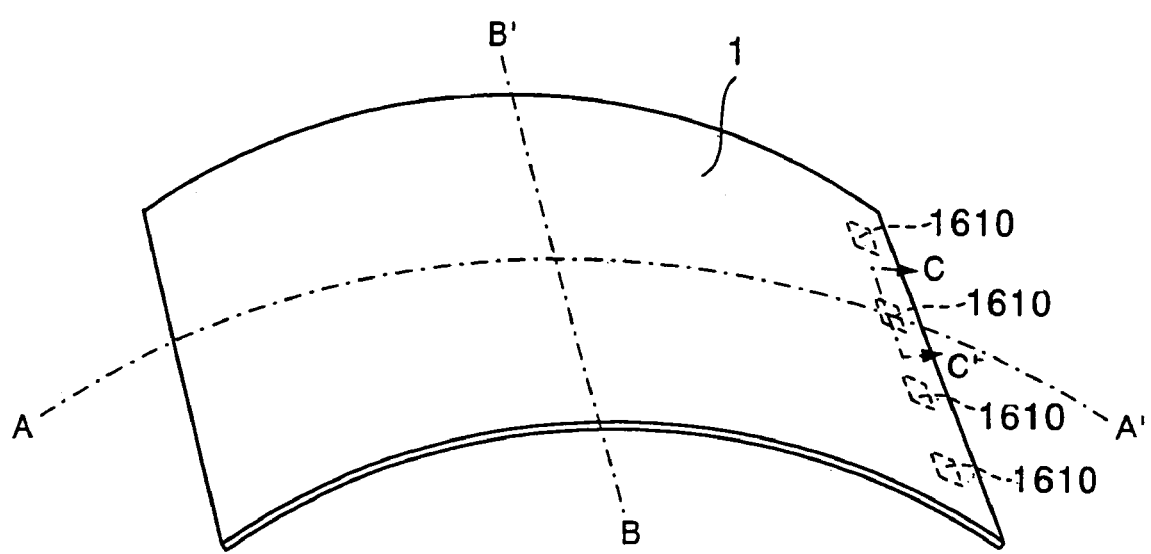
FIG. 19B is an oblique perspective view of an active matrix type display device according to another modification of the ninth embodiment of the present invention.
Figure 19C:
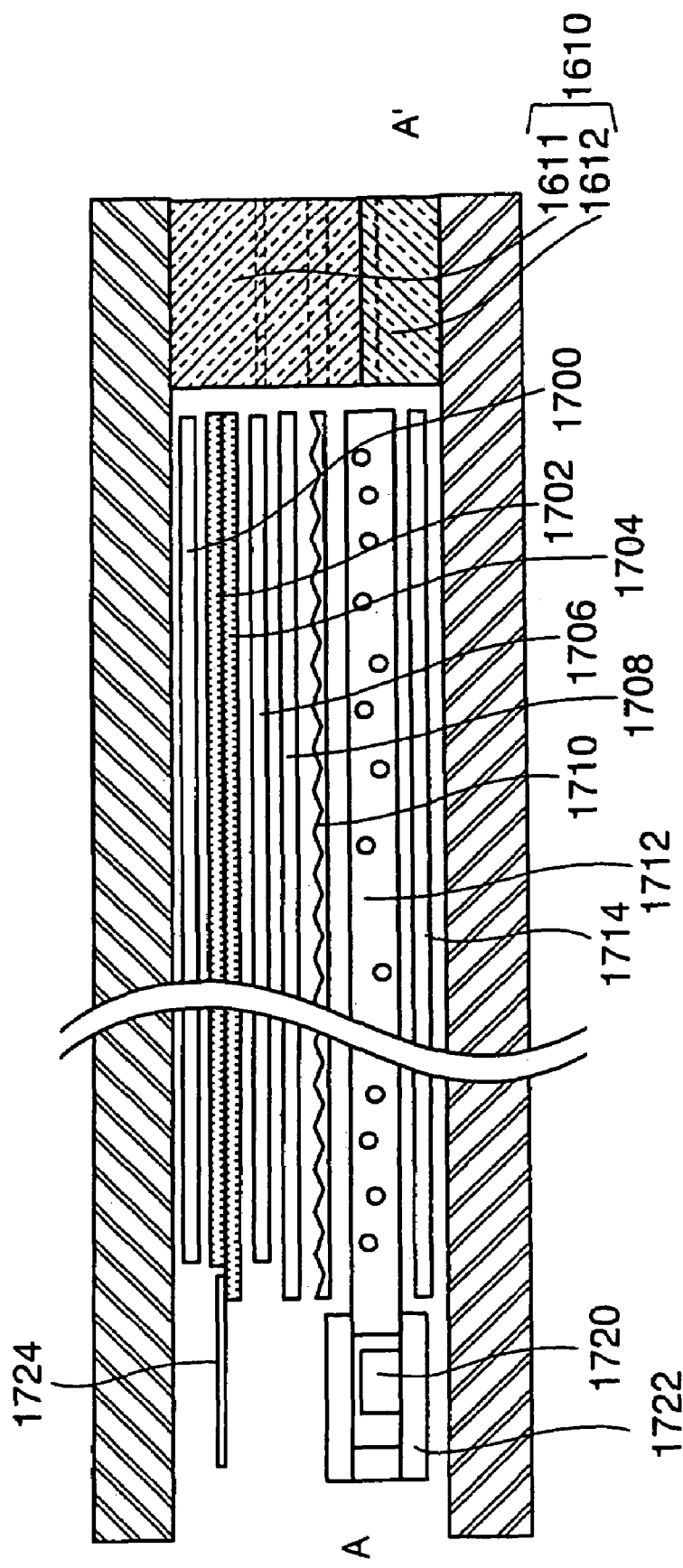
FIG. 19C is a cross-sectional view taken along a line A–A' in FIG. 19B.
Figure 19D:
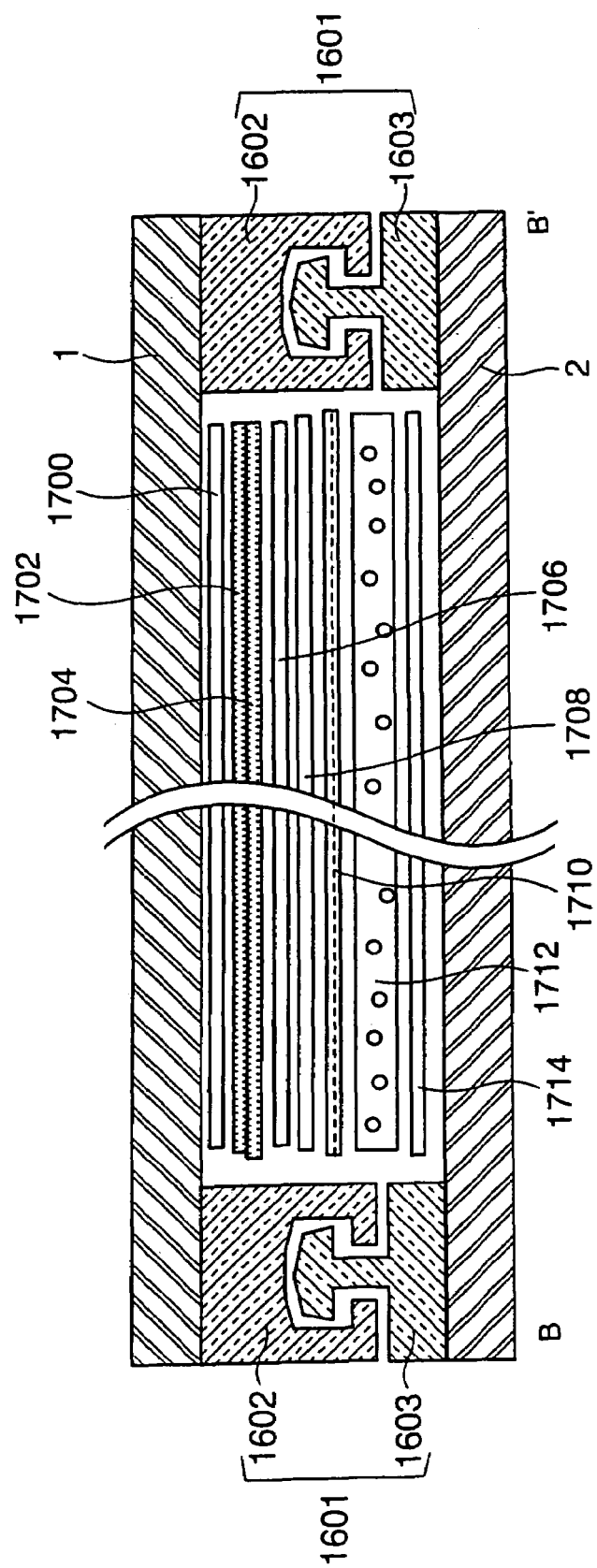
FIG. 19D is a cross-sectional view taken along a line B–B' in FIG. 19B.
Figure 19E:
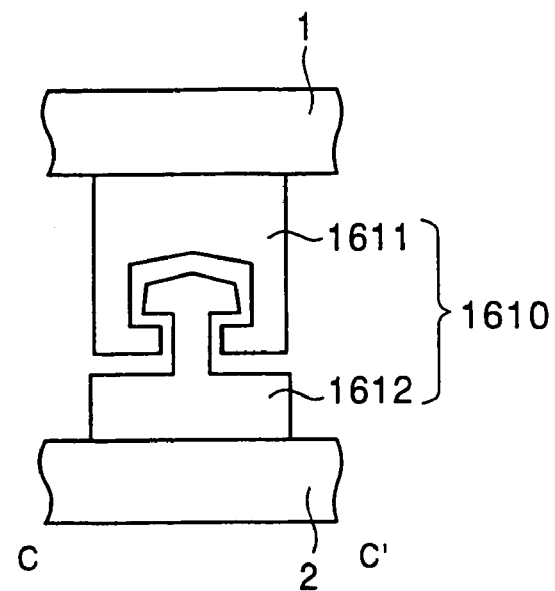
FIG. 19E is a cross-sectional view taken along a line C–C' in FIG. 19B.

FIG. 19B is a diagram showing a display device in a case where the retainers 1610 are provided on the side perpendicular to the bendable sides, FIG. 19C is a cross-sectional view taken along a line A—A in FIG. 19B', FIG. 19D is a cross-sectional view taken along a line B–B' in FIG. 19B, and FIG. 19E is a cross-sectional view taken along a line C–C' in FIG. 19B.

In this example, as shown in FIG. 19B, four retainers 1610 are provided on the side perpendicular to the bendable sides. As shown in FIG. 19E, each retainer 1610 includes a first retaining member (a first close contact member) 1611 fixed to the first thin plate 1 and a second retaining member (a second close contact member) 1612 fixed to the second thin plate 2. The first retaining member 1611 and the second retaining member 1612 are in a loose engagement (fit) to move slidably. In FIG. 19E, when trying to separate the first thin plate 1 and the second thin plate 2 upward and downward, they never separate from each other because holding portions are fit together, but they can slide in the bendable direction. Therefore, it is possible to restrain the separation of the first thin plate 1 and the second thin plate 2 while allowing displacement therebetween.

FIG. 19C and FIG. 19D show a more detailed internal structure of the display device. That is, the display device includes an opposite substrate 1702 and an array substrate 1704 between a first polarizing plate 1700 and a second polarizing plate 1706. The opposite substrate 1702 and the array substrate 1704 constitute a liquid crystal cell in this embodiment. A flexible cable 1724 for inputting signals is connected to the array substrate 1704.

Under the second polarizing plate 1706 in this drawing, a diffusion sheet 1708 and a prism lens sheet 1710 are provided, and a light guide plate 1712 is provided under them. In addition, a reflection plate 1714 is provided under the light guide plate 1712 in this drawing. The light guide plate 1712 is made of flexible transparent resin including fine particle for the light diffusion. A light source 1720 such as an LED or the like is attached to the light guide plate 1712 via an attachment member 1722. Therefore, light emitted from the light source 1720 propagates in the light guide plate 1712, the light radiates gradually from the surface of the light guide plate 1712, the direction of the light is controlled by the prism lens sheet 1710, and the light is made uniform by the diffusion sheet 1708 and radiates to the upward direction of the light guide plate 1712 in this drawing.

Figure 19F:
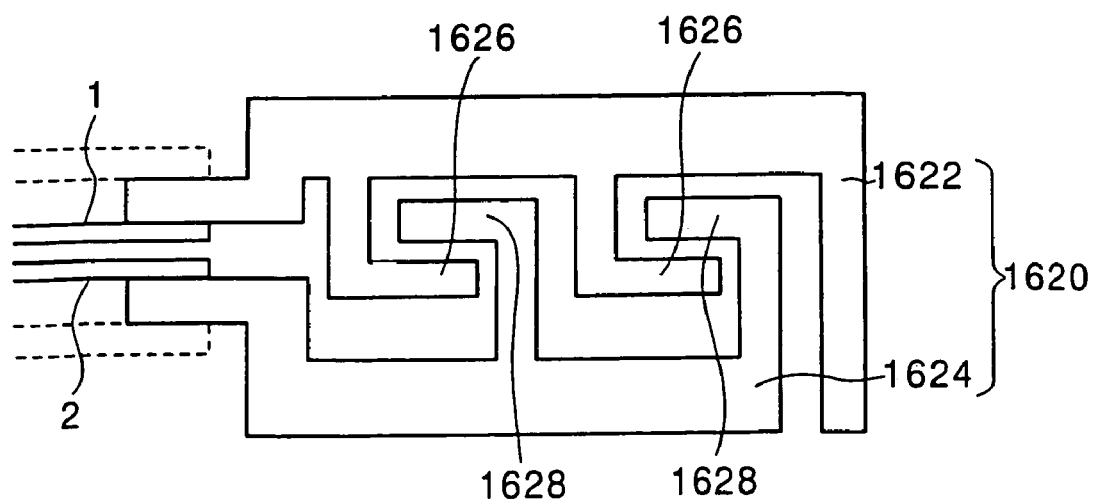
FIG. 19F is a cross-sectional view for explaining a modification of a retainer.

FIG. 19F is a diagram showing a modification of the retainers 1601 and 1610. As shown in FIG. 19F, each retainer 1620 includes a first retaining member (a first close contact member) 1622 fixed to the first thin plate 1 and a second retaining member (a second close contact member) 1624 fixed to the second thin plate 2.

Two L-shaped projecting portions 1626 is are formed in the first retaining member 1622, and two inverted L-shaped projecting portions 1628 are formed in the second retaining member 1624. The two L-shaped projecting portions 1626 and the two inverted L-shaped projecting portions 1628 are engaged with each other. That is, the L-shaped projecting portions 1626 and the inverted L-shaped projecting portions 1628 are fitted to each other so as to be hooked together. Therefore, the first retaining member 1622 provided with the L-shaped projecting portions 1626 and the second retaining member 1624 provided with the inverted L-shaped projecting portions 1628 are in a loose engagement to move slidably. The right end of the first retaining member 1622 (upside in this drawing) serves as a cover, so that it looks attractive on the outside. In addition, the double engagement restrains the retainer 1620 from coming off, even if they slide easily.

Tenth Embodiment

Figure 20A:
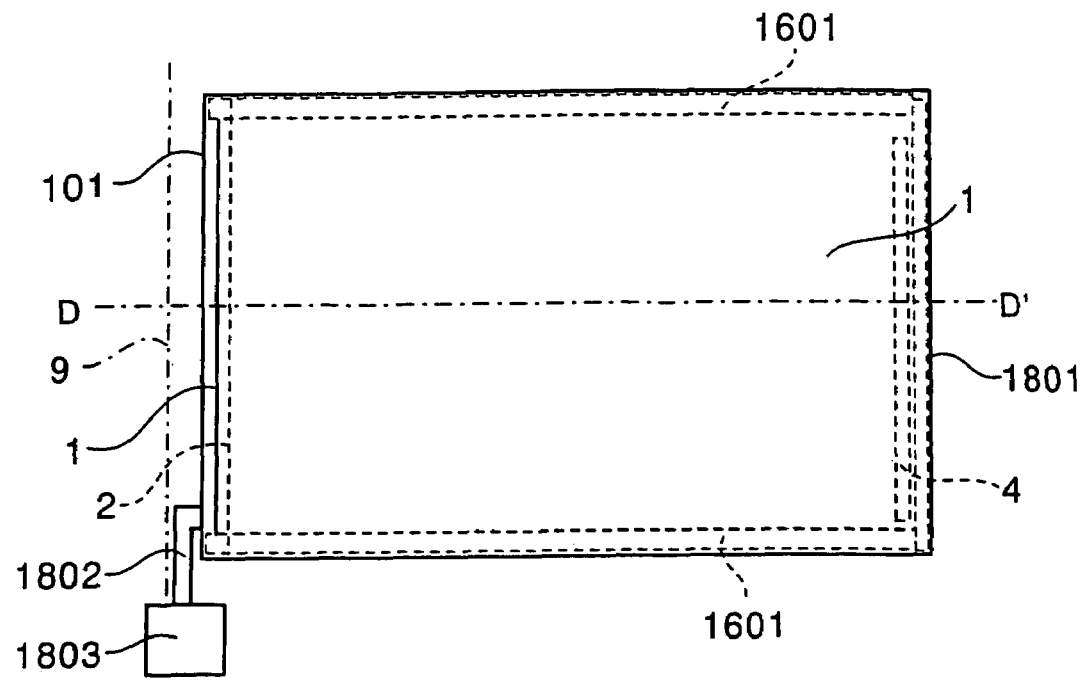
FIG. 20A is a plane view of an active matrix type display device according to a tenth embodiment of the present invention.
Figure 20B:
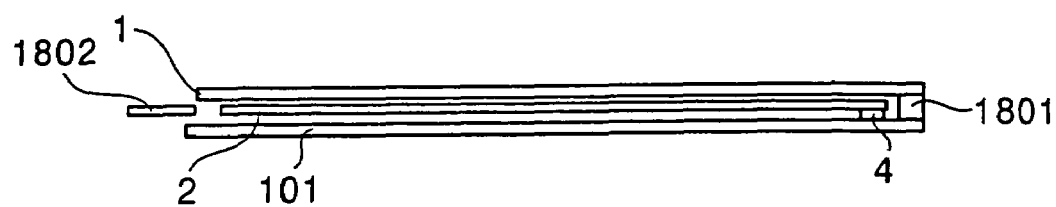
FIG. 20B is a cross-sectional view taken along a line D–D' in FIG. 20A.

Next, a tenth embodiment is described using FIGS. 20A and 20B. FIG. 20A is a plane view showing an active matrix type display device of this embodiment, and FIG. 20B is a cross-sectional view taken along a line D–D' in FIG. 20A. This embodiment is described regarding points different from the ninth embodiment, and the descriptions of the same portions are omitted.

In this embodiment, a peripheral portion outside a fixing portion 4 is sealed with an adhesive portion 1801, and both sides perpendicular thereto are sealed with retainers 1601 described in the ninth embodiment, resulting in a structure that all the sides other than that along a winding axis 9 end are covered.

Then, this embodiment is designed such that air between a thin plate 1 and a third thin plate 101 can be exhausted through an exhaust pipe 1802 which is provided on a side along the winding axis 9 end and connected to an exhaust mechanism 1803. Although details near the exhaust pipe 1802 are not shown in FIGS. 20A and 20B, the gap between the first thin plate 1 and third thin plate 101 is preferably sealed, on the side along the winding axis 9 end, with a soft film to prevent the exhaust from leaking.

Exhaustion after the display part is drawn out in the structure of this embodiment reduces the pressure in the display part so that it is pressed by an atmospheric pressure from above and below and thus spaced surfaces are closely adhered to each other. As a result, the plates do not slide each other. Consequently, the display part, when drawn out, exhibits strength to become rigid, resulting in a shape close to a flat face without support. The exhaustion makes this plate structure be in a condition where surfaces of the plate structure are clamped. The exhaustion may be performed in conjunction with a bend and extension. Introduction of air in bending allows a slide so that the display part can be easily bent.

The exhaustion is not necessarily performed at all times when the display part is drawn out. Although not shown in FIGS. 20A and 20B, the above-described clamps may be provided so as to clamp the display part after exhaustion of air, thus providing strength by clamping. The exhaustion implemented not by using power but by using a mechanism which exhausts air by a small amount through the motion of winding and drawing, also provides an effect.

Eleventh Embodiment

Figure 21A:
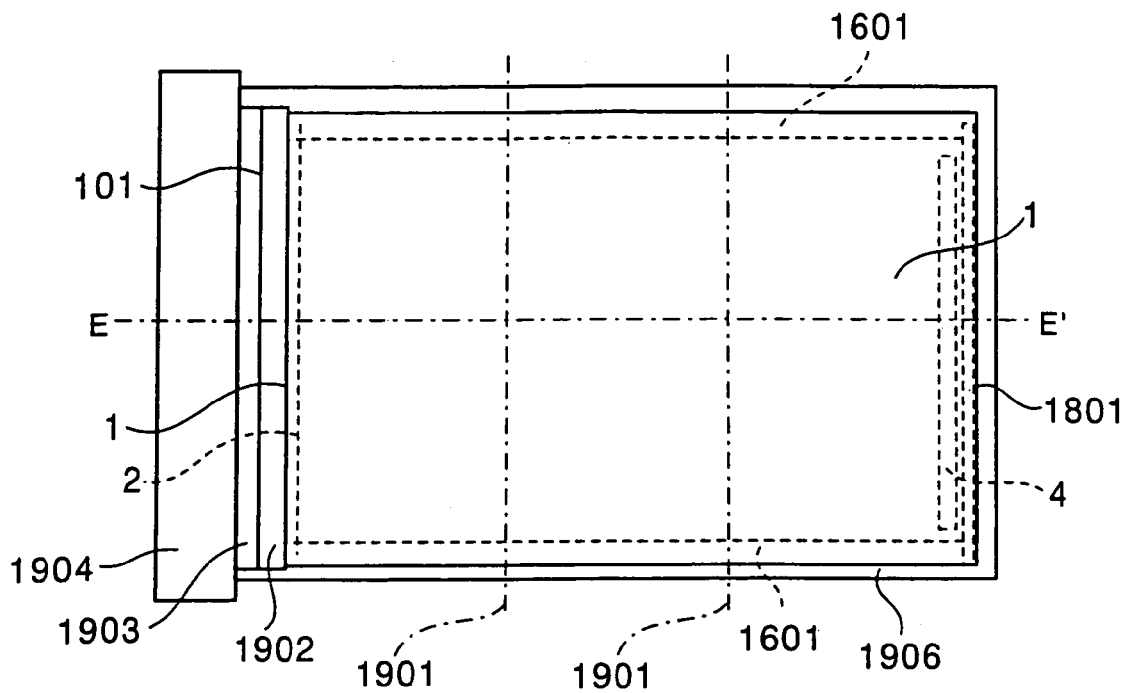
FIG. 21A is a plane view of an active matrix type display device according to an eleventh embodiment of the present invention.
Figure 21B:
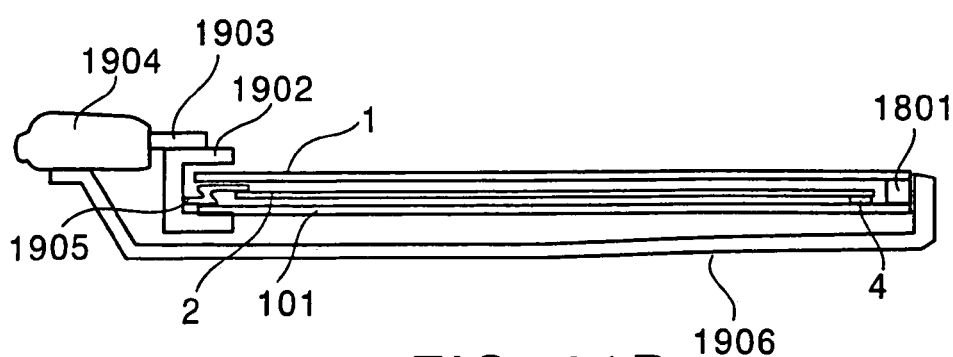
FIG. 21B is a cross-sectional view taken along a line E–E' in FIG. 21A.
Figure 21C:
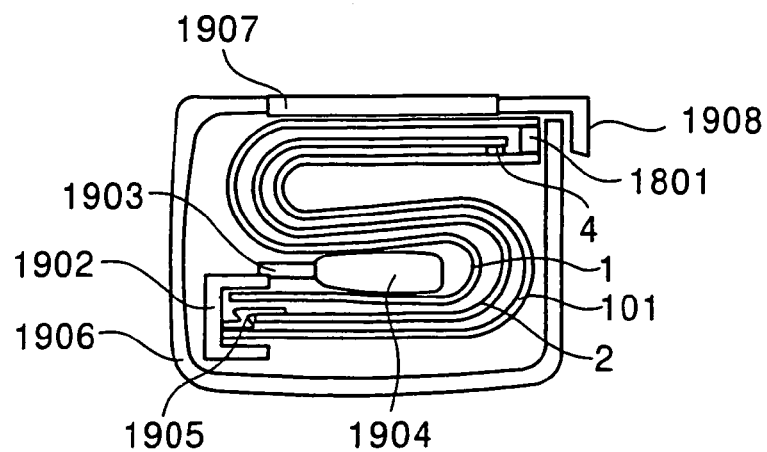
FIG. 21C is a cross-sectional view taken along the line E–E' in FIG. 21A in its accommodated state.

Next, an eleventh embodiment is described using FIGS. 21A to 21C. FIG. 21A is a plane view showing an active matrix type display device of this embodiment, FIG. 21B is a cross-sectional view taken along a line E–E' in FIG. 21A, and FIG. 21C is a cross-sectional view taken along the line E–E' in FIG. 21A in its accommodated state. This embodiment is described regarding points different from the tenth embodiment, and the descriptions of the same portions are omitted.

This embodiment shows a form of a display part to be accommodated folded in an S-shape.

A control box 1904 in which a battery, a CPU, and a communicating unit, and so on are installed is provided and connected to a connecting structure 1902 via a connecting portion 1903. To the connecting structure 1902, a wiring 1905 taken out of the display part is connected to establish connection with a predetermined circuit via the connecting portion 1903.

An accommodating container 1906 while folding is made of a flexible material or folded at several points so as to be able to extend over the rear surface of the display part when opened.

To realize the accommodation as shown in FIG. 21C, it is only required that the box 1904 is folded at the connecting portion 1903, the display part is folded into three portions in the S-shape near fold positions 1901 into a small piece, and the cover 1906 encloses its periphery and fixes to the cover 1906 itself with a hook 1908. Retainers 1601 are the same as those in the tenth embodiment, and can be configured such that their fit direction is changed at positions where the bend direction is changed.

It is also adoptable to provide a structure in which a window 1907 is provided in one surface of the accommodating container 1906 so that one can see a part of the upper display surface of the display part folded into three portions. This allows a little information such as schedule, time, and data arrival to be seen even in an accommodated state of the display part. It is also possible to provide an operation button on the cover 1906 or provide buttons at upper and lower ends of the box 1904 as necessary for operation.

In addition to winding the display part into the accommodating container, or folding it into three portions or in an S-shape, winding it around the accommodating container (device housing) is also possible.

The above-described embodiments are not limited but can be used also in various combinations. In addition, the polarizing plate and the liquid crystal cell are not separated but a substrate of the liquid crystal cell may have a polarizing function. That is, one unit in which a polarizing layer of thin film is formed on the surface of a plastic film substrate can be used.

Additional advantages and modifications will readily occur to those skilled in the art. Therefore, the invention in its broader aspects is not limited to the specific details and representative embodiments shown and described herein. Accordingly, various modification may be made without departing from the spirit or scope of the general inventive concept as defined by the appended claims and their equivalents.

What is claimed is:

1. A display device, comprising:
   a display part including a first thin plate having flexibility and a second thin plate having flexibility, the second thin plate being provided over the first thin plate;
   a fixing portion which fixes the first thin plate and the second thin plate together on a first direction within each main surface of the first and second thin plates;
   a close contact member which is provided in a second direction perpendicular to the first direction within the main surface, and which brings the first thin plate and the second thin plate into close contact, wherein the close contact member allows the first thin plate and the second thin plate to be slid in the second direction; and
   a clamp capable of holding and fixing the first thin plate and the second thin plate.

2. The display device according to claim 1, wherein the close contact member is a guide member which prevents the first thin plate and the second thin plate from displacing in the first direction.

3. The display device according to claim 1, wherein one of the first thin plate and the second thin plate is one selected from a group consisting of a liquid crystal cell, an organic EL cell, an electrophoretic cell, an electrochemical effect cell, and a mechanical display cell.

4. The display device according to claim 1, wherein one of the first thin plate and the second thin plate is one selected from a group consisting of a polarizing plate, an input device, a backlight, and a cover member.

5. The display device according to claim 1, further comprising an accommodating container which winds and accommodates the display part and the close contact member.

6. The display device according to claim 1, wherein the display part is rectangular whose one side is along the first direction, and the display device further comprises an accommodating container which winds and accommodates the display part and the close contact member with a side parallel to the one side as a winding axis.

7. A display device, comprising:
   a display part including a first thin plate having flexibility and a second thin plate having flexibility, the second thin plate being provided over the first thin plate;
   a fixing portion which fixes the first thin plate and the second thin plate together on a first direction within each main surface of the plates;
   a first close contact member which has flexibility and which is provided linearly in a second direction perpendicular to the first direction at both sides of a surface of the first thin plate which faces the second thin plate, wherein the first close contact member is fixed to the first thin plate;
   a second close contact member which has flexibility and which is provided linearly in the second direction at both sides of a surface of the second thin plate which faces the first thin plate, wherein the second close contact member is fixed to the second thin plate, and the second close contact member is slidably engaged with the first close contact member so that the first thin plate and the second thin plate are slidably in the second direction with each other; and
   a clamp capable of holding and fixing the first thin plate and the second thin plate.

8. The display device according to claim 7, wherein the first close contact member includes a recess portion, and the second close contact member includes a projecting portion fitting in the recess portion.

9. The display device according to claim 7, wherein one of the first thin plate and the second thin plate is one selected from a group consisting of a liquid crystal cell, an organic EL cell, an electrophoretic cell, an electrochemical effect cell, and a mechanical display cell.

10. The display device according to claim 7, wherein one of the first thin plate and the second thin plate is one selected from a group consisting of a polarizing plate, an input device, a backlight, and a cover member.

11. The display device according to claim 7, further comprising an accommodating container which winds and accommodates the display part and the close contact member.

12. The display device according to claim 7, wherein the display part is rectangular whose one side is along the first direction, and the display device further comprises an accommodating container which winds and accommodates the display part and the close contact member with a side parallel to the one side as a winding axis.

13. The display device according to claim 7, wherein the first close contact member includes a first projecting portion which is L-shaped, and the second close contact member includes a second projecting portion which is inverted L-shaped and which fits in the first projecting portion.

14. The display device according to claim 7, wherein the first thin plate and the second thin plate are brought into close contact to fix a shape of the display part by exhausting air between the first thin plate and the second thin plate.

15. A display device, comprising:
   a display part including a first thin plate having flexibility and a second thin plate having flexibility, the second thin plate being provided over the first thin plate, wherein a third thin plate is provided between the first thin plate and the second thin plate;
   a fixing portion which fixes the first thin plate, the second thin plate and the third thin plate along a first direction within each main surface of the first, second and third thin plates; and
   a close contact member which is provided in a second direction perpendicular to the first direction within the main surface, and which brings the first thin plate, the second thin plate and the third thin plate into close contact, wherein the close contact member allows the first thin plate, the second thin plate and the third thin plate to be slid in the second direction.

16. The display device according to claim 15, wherein the close contact member comprises a first contact member which is provided with the first thin plate and a second contact member which is provided with the second contact member, the first contact member and the second contact member allow the first thin plate and the second thin plate to be slid, and the third thin plate is interleaved between the first thin plate and the second thin plate so that the third thin plate is in close contact with the first thin plate and the second thin plate.

17. The display device according to claim 15, wherein one of the first thin plate and the second thin plate is a cover member.

18. The display device according to damn 15, wherein the display part further includes a fourth thin plate between the first thin plate and the second thin plate, and wherein at least one of the first thin plate and the second thin plate is a cover member for covering the third thin plate and the fourth thin plate, the third thin plate is a display main part, and the fourth thin plate is a display secondary part.

19. The display device according to claim 15, wherein the display part further includes a fourth thin plate between the first thin plate and the second thin plate, and wherein at least one of the first thin plate and the second thin plate is a cover member for covering the third thin plate and the fourth thin plate, the third thin plate is a liquid crystal cell, and the fourth thin plate is a polarizing plate.

20. The display device according to claim 16, wherein the display part further includes a fifth thin plate between the first thin plate and the second thin plate, and the fifth thin plate is a backlight.

21. The display device according to claim 15, wherein the display part further includes a fourth thin plate between the first thin plate and the second thin plate, and wherein at least one of the first thin plate and the second thin plate is a cover member for covering the third thin plate and the fourth thin plate, the third thin plate is an input device, and the fourth thin plate is a display plate.

* * * * *